(12) United States Patent
Jaipaul et al.

(10) Patent No.: US 10,865,083 B2
(45) Date of Patent: Dec. 15, 2020

(54) VEHICLE LIFT SYSTEM WITH ADVANCED OPERATING PLATFORM

(71) Applicant: Gray Manufacturing Company, Inc., St. Joseph, MO (US)

(72) Inventors: Larry M. Jaipaul, Clarence, NY (US); Stephen J. Rucker, Savannah, MO (US); Raymond C. Chan, St. Joseph, MO (US)

(73) Assignee: Gray Manufacturing Company, Inc., St. Joseph, MO (US)

( * ) Notice: Subject to any disclaimer, the term of this patent is extended or adjusted under 35 U.S.C. 154(b) by 0 days.

(21) Appl. No.: 16/118,887

(22) Filed: Aug. 31, 2018

(65) Prior Publication Data

US 2018/0370777 A1 Dec. 27, 2018

Related U.S. Application Data

(63) Continuation of application No. 14/628,620, filed on Feb. 23, 2015, now Pat. No. 10,065,842.
(Continued)

(51) Int. Cl.
*B66F 3/46* (2006.01)
*B66F 3/24* (2006.01)
*G06F 21/00* (2013.01)

(52) U.S. Cl.
CPC ............... *B66F 3/46* (2013.01); *B66F 3/24* (2013.01); *G06F 21/00* (2013.01); *G06F 2221/2141* (2013.01); *G06F 2221/2149* (2013.01)

(58) Field of Classification Search
CPC .... B66F 3/46; B66F 3/24; G06F 21/00; G06F 2221/2141; G06F 2221/2149
(Continued)

(56) References Cited

U.S. PATENT DOCUMENTS 6,983,196 B2 1/2006 Green et al.
7,191,038 B2 3/2007 Green et al.
(Continued)

FOREIGN PATENT DOCUMENTS

CN 102066234 A 5/2011
DE 4323763 A1 1/1994
(Continued)

*Primary Examiner* — Jeffrey Donels
(74) *Attorney, Agent, or Firm* — Hovey Williams LLP; Kameron D. Kelly

(57) ABSTRACT

A vehicle lift system incorporating one or more lift control modules having an advanced operating platform. The lift control module includes a user interface for receiving user instructions from a user, at least one control module processor, and a non-transitory computer-readable medium with an advanced operating platform stored thereon. The computer readable medium includes a first application operable executable by the advanced operating platform. The first application directs the control module processor to provide instructions to the vehicle lift to control the vehicle lift based on the user instructions. The computer readable medium further includes a second application executable by the advanced operating platform. The second application directs the control module processor to perform certain steps, with such certain steps not directed to controlling the vehicle lift. Furthermore, the advanced operating platform is configured to execute said first application and said second application simultaneously.

19 Claims, 13 Drawing Sheets

Related U.S. Application Data

(60) Provisional application No. 61/946,230, filed on Feb. 28, 2014, provisional application No. 61/970,703, filed on Mar. 26, 2014.

(58) Field of Classification Search
USPC .......................................................... 187/391
See application file for complete search history.

(56) References Cited

U.S. PATENT DOCUMENTS

| | | | |
|---|---|---|---|
| 7,272,476 B2 | 9/2007 | Ortiz et al. | |
| 7,359,775 B2 | 4/2008 | Strege et al. | |
| 8,083,034 B2 | 12/2011 | Bordwell et al. | |
| 8,719,857 B1* | 5/2014 | Ellis | H04N 21/4312 |
| | | | 725/27 |
| 9,376,296 B2* | 6/2016 | Nussbaum | B66F 7/28 |
| 9,611,128 B2* | 4/2017 | Van Houten | B66F 3/46 |
| 2005/0182522 A1* | 8/2005 | Chase | B66F 7/04 |
| | | | 700/275 |
| 2006/0178792 A1 | 8/2006 | Ortiz et al. | |
| 2011/0138444 A1* | 6/2011 | Kang | G06F 21/31 |
| | | | 726/3 |
| 2013/0240300 A1* | 9/2013 | Fagan | B66F 3/46 |
| | | | 187/210 |
| 2013/0240812 A1* | 9/2013 | Helmich | B66F 3/46 |
| | | | 254/89 H |
| 2014/0208269 A1* | 7/2014 | Boyana | H04M 1/66 |
| | | | 715/835 |
| 2014/0324214 A1* | 10/2014 | Elliott | B66F 13/00 |
| | | | 700/213 |
| 2014/0339023 A1* | 11/2014 | Friedli | B66B 1/2408 |
| | | | 187/247 |
| 2015/0232309 A1* | 8/2015 | Jaipaul | B66F 7/04 |
| | | | 414/800 |
| 2016/0202111 A1* | 7/2016 | Fahey | B65D 90/143 |
| | | | 177/141 |

FOREIGN PATENT DOCUMENTS

| | | |
|---|---|---|
| GB | 2360500 B | 10/2003 |
| JP | 8-333093 A | 12/1996 |
| WO | 2008/125101 A1 | 10/2008 |

* cited by examiner

VEHICLE LIFT SYSTEM WITH ADVANCED OPERATING PLATFORM

CROSS-REFERENCE TO RELATED APPLICATIONS

This non-provisional patent application is a continuation application of U.S. patent application Ser. No. 14/628,620, filed Feb. 23, 2015, which claims priority to U.S. Provisional Patent Application Ser. No. 61/946,230, filed Feb. 28, 2014, and U.S. Provisional Patent Application Ser. No. 61/970,703, filed Mar. 26, 2014. The entire disclosures of all above-identified non-provisional and provisional patent applications are hereby incorporated by reference into this non-provisional patent application.

BACKGROUND

1. Field of the Invention

The present invention relates generally to portable vehicle lifts. More particularly, the invention concerns portable vehicle lift systems with advanced operating platforms.

2. Description of the Prior Art

The need to lift a vehicle from the ground for service work is well established. For instance, it is often necessary to lift a vehicle for tire rotation or replacement, steering alignment, oil changes, brake inspections, exhaust work, and other automotive maintenance. Traditionally, lifting a vehicle has been accomplished through the use of equipment that is built-into a service facility, such as lift units with the hydraulic actuator(s) installed below a surface of the service facility's floor or two and four post-type lift systems installed on the floor surface of the service facility. These built-in units are located at a fixed location at the service facility and adapted to engage the vehicle frame to lift the vehicle from the ground.

In an effort to increase the versatility and mobility of lift devices and to reduce the need to invest in permanently mounted lifting equipment, devices commonly known as a mobile column lifts (MCL's) have been developed. Traditional MCL's use a number of connecting lines or wires to provide electrical power and/or to provide communication between the MCL's. Descriptions of such exemplary MCLs systems are provided in U.S. Pat. No. 6,315,079 and in U.S. Pat. No. 6,634,461, the entire disclosures of which are incorporated herein by reference.

Prior MCL systems, such as those identified above, utilize basic operating platforms that generally restrict the functionality of the lift systems to limited numbers and/or types of operations, such as simple lifting and lowering operations. Such limitations reduce productivity and create inconveniences for operators of the MCLs. Additionally, currently-used operating platforms require a significant amount of time to boot-up from a complete shut-down and are also a significant drain on the electrical systems (e.g., the battery) of the MCL systems.

Accordingly, there remains a need for a vehicle lift system with an advanced operating platform that improves the functionality of the lift system and can also improve the lift and the lift operators' operational efficiencies. Additionally, there is a need for an advanced operating platform that facilitates a quick boot-up time and reduces electrical drain, so as to allow for users to have access to vehicle lifts in a quick and efficient manner.

SUMMARY OF THE INVENTION

In one embodiment of the present invention, there is provided a vehicle lift system including a vehicle lift with a post, an actuator, and a carriage assembly. The vehicle lift additionally comprises a lift control system for controlling the actuator so as to lift the carriage assembly relative to the post. The lift control system includes at least one core processor. The vehicle lift further comprises a lift control module for providing instructions to the lift control system, with the lift control module including a user interface for receiving user instructions from a user, at least one control module processor, and a non-transitory computer-readable medium with an advanced operating platform stored thereon. The computer-readable medium further includes one or more electronic libraries stored thereon, with the electronic libraries being accessible by the advanced operating platform. Each of the electronic libraries include one or more library program codes for instructing the at least one control module processor to perform steps. The computer readable medium additionally includes a first application operable to be executed by the advanced operating platform. The first application directs the at least one control module processor to provide instructions to the lift control system to control the actuator based on the user instructions. The computer readable medium further includes a second application operable to be executed by the advanced operating platform. The second application directs the at least one control module processor to perform certain steps, with such certain steps not directed to controlling the actuator. At least one of the first application or the second application instructs the control module process to perform steps based, at least in part, on the library program codes in the one or more electronic libraries. The lift control system further includes a communication link between the lift control system and the lift control module.

In another embodiment of the present invention, there is provided a lift control module for providing instructions to a vehicle lift. The lift control module comprises a user interface for receiving user instructions from a user, at least one control module processor, and a non-transitory computer-readable medium with an advanced operating platform stored thereon. The computer readable medium includes a first application operable to be executed by the advanced operating platform. The first application directs the at least one control module processor to provide instructions to the vehicle lift to control the vehicle lift based on the user instructions. The computer readable medium further includes a second application operable to be executed by the advanced operating platform. The second application directs the at least one control module processor to perform certain steps, with such certain steps not directed to controlling the vehicle lift. Furthermore, the advanced operating platform is operable to execute said first application and said second application simultaneously.

In another embodiment of the present invention, there is provide a non-transitory computer-readable storage medium with an advanced operating platform stored thereon for controlling a vehicle lift. The advance operating platform is operable to instruct a processor of a lift control module to perform a plurality of steps. One of the steps includes generating a user interface displayable on a display device of the lift control module. Another step includes receiving information, via the user interface, indicative of a first user instruction for the lift control module to perform a first function, with the first function including controlling an actuator associated with the vehicle lift. An additional step includes providing instructions to the vehicle lift to perform the first function in response to the first user instruction. A further step includes receiving information, via the user interface, indicative of a second user instruction to perform a second function. A still further step incudes performing the second function in response to the second user instruction, with the first function and the second function being performed simultaneously.

In yet another embodiment of the present invention, there is provided a lift control module for providing instructions to a vehicle lift, with the vehicle lift and the lift control module being powered by a battery. The lift control module comprises a graphical display for displaying information to a user, a communications network for communicating with the vehicle lift, at least two processors, and a non-transitory computer-readable storage medium with a computer program stored thereon. The computer program instructs at least one of the processors to perform a plurality of steps. A first step includes determining an initial voltage level of the battery. If the voltage level of the battery is below an operational voltage, a next step includes providing a signal to deactivate the lift control module. If the voltage level of the battery is above the operational voltage, a next step includes providing a signal for the lift control module to enter a light sleep mode. In the light sleep mode, the graphic display of the lift control module does not consume electrical power from the battery. While in the light sleep mode, the computer program instructs, in an additional step, at least one of the processors to periodically determine a subsequent voltage level of the battery. After the subsequent voltage is determined, if the subsequent voltage level of the battery is below the operational voltage, the computer program instructs, in a next step, at least one of the processors to provide a signal to deactivate the lift control module. If the voltage level of the battery is above the operational voltage, the computer program instructs, in a next step, at least one of the processors to provide a signal for the lift control module to remain in the light sleep mode.

DETAILED DESCRIPTION OF THE PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

System

Figure 1:
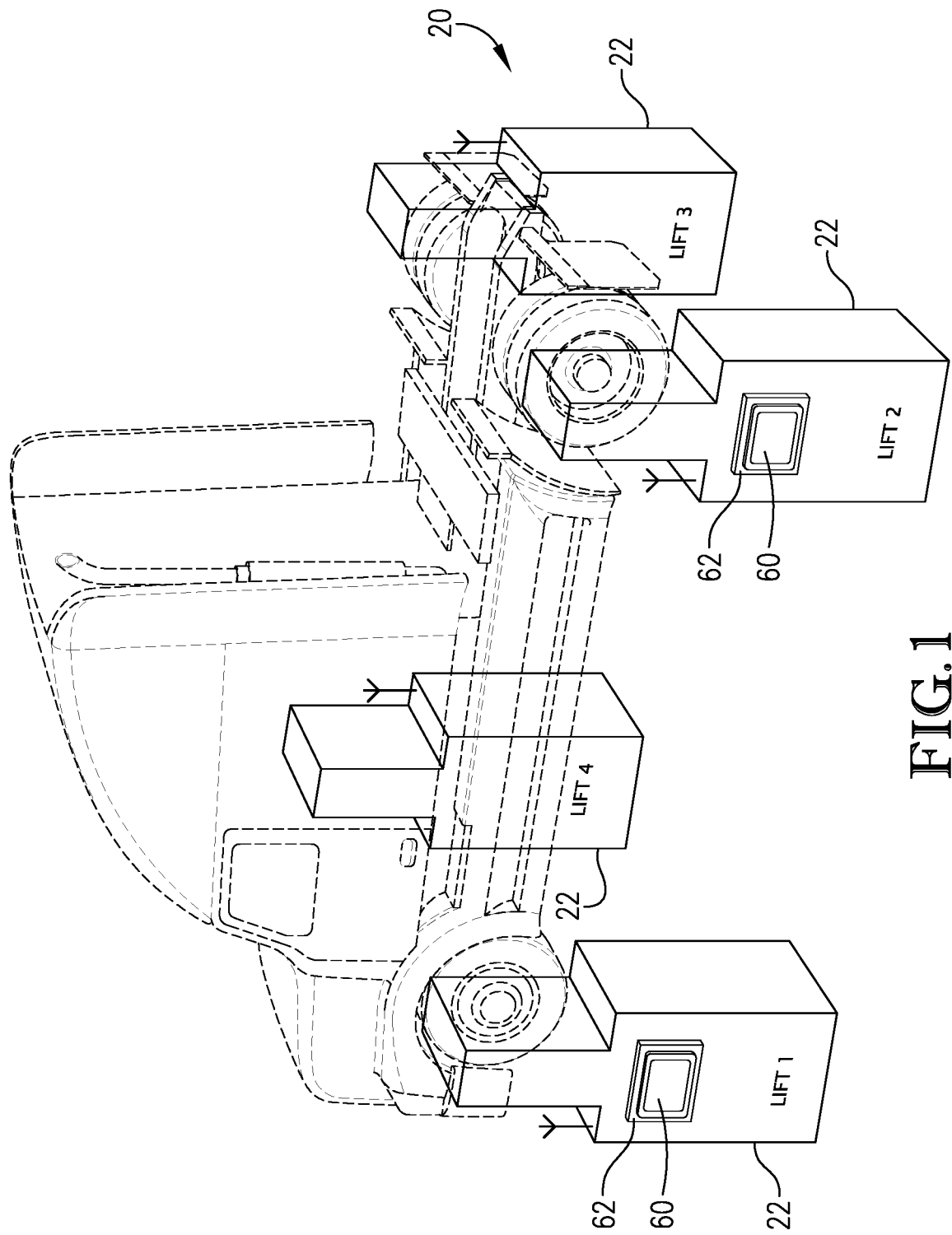
FIG. 1 is a simplified representation of a vehicle lift system utilizing four individual vehicle lifts to perform a coordinated lift of a vehicle, where one or more of the vehicle lifts is equipped with a lift control module that is readily detachable from the lift.

Referring now to the drawings in detail, and initially to FIG. 1, numeral 20 generally designates a wireless portable vehicle lift system having four individual portable lifts 22. This vehicle lift system 20 is similar, in certain respects, to the vehicle lift system described in U.S. Patent App. Publ. No. 2013/0240300, which is incorporated by reference into the present non-provisional patent application. Although FIG. 1 depicts a four lift system 20, it should be understood that any combination of two or more lifts 22 can be used. For example, the lift system 20 can employ two, four, six, or eight individual lifts 22. In certain embodiments, each of the individual lifts 22 is substantially identical. It should also be understood that lift system 20 is not limited for use with vehicles, but also may be used to raise or lower other objects relative to a floor or ground surface, such as aircraft, industrial machinery, shipping containers, construction subassemblies, and the like.

Figure 2:
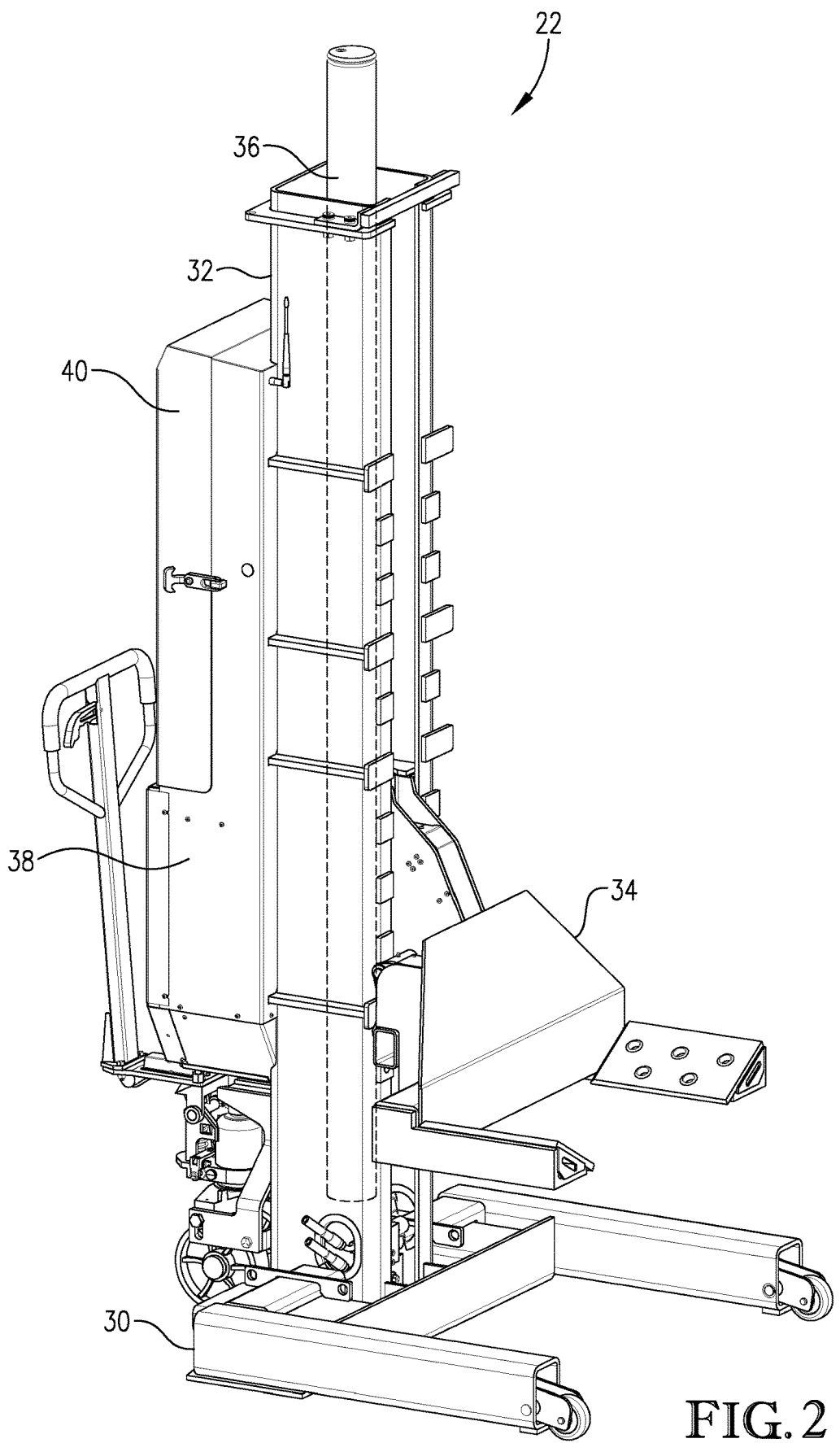
FIG. 2 is a perspective view showing the front and side of a vehicle lift configured in accordance with certain embodiments of the present invention.
Figure 3A:
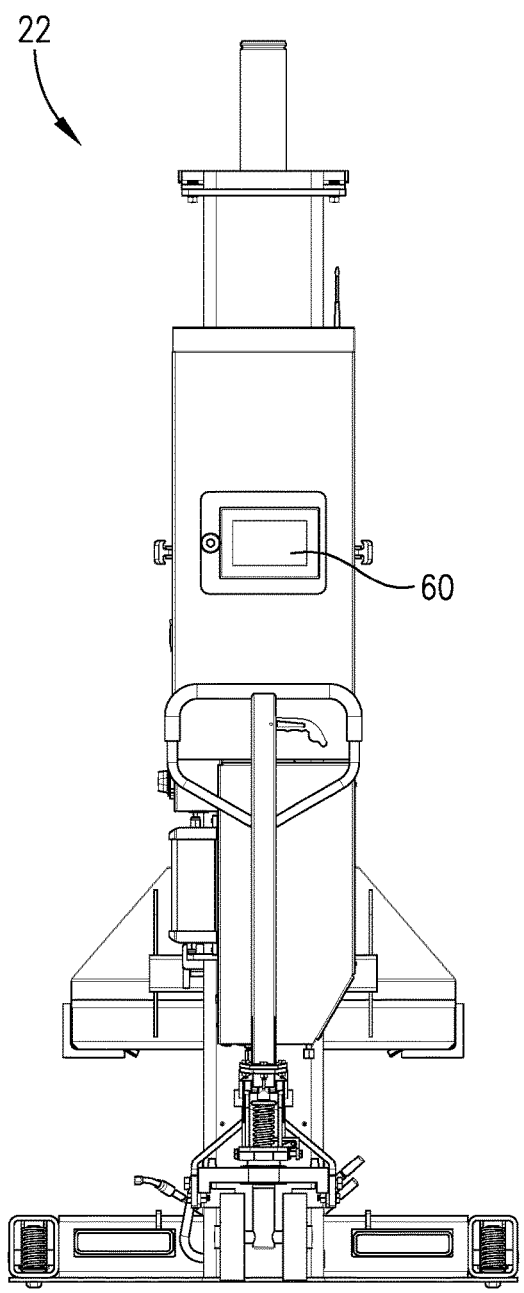
FIG. 3a is a back elevation view of the vehicle lift of FIG. 2.
Figure 3B:
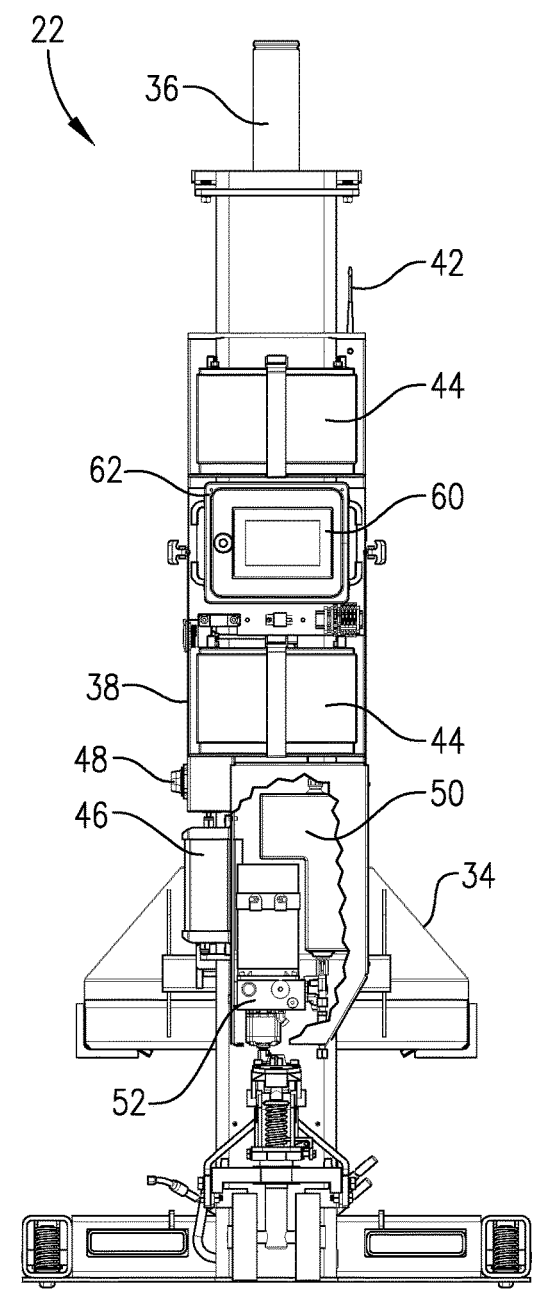
FIG. 3b is a back elevation view of the vehicle lift of FIG. 2, with certain portions of the main housing being remove or cut away to show individual components of the lift's power and control systems.

With reference to FIGS. 2, 3a, and 3b, one of the lifts 22 configured in accordance with embodiments of the present invention is illustrated. The lift 22 can include a base 30, a post 32, a carriage assembly 34, a lift actuator 36, and a main housing 38. The base 30 supports the lift 22 on the floor or the ground. The post 32 is rigidly coupled to the base 30 and extends upwardly therefrom. The carriage assembly 34 is configured to engage a wheel of a vehicle and is vertically shiftable relative to the post 32. The lift actuator 36 is received in the post 32 and is operable to vertically raise and lower the carriage assembly 34 relative to the post 32 and the base 30. The main housing 38 is attached to the post 32 and encloses many of the components of that make up the control and power systems for the various components of the lift 22, as will be described in more detail below. The main housing 38 includes a removable access panel 40 for providing access to various components of such systems.

FIGS. 3a and 3b provide a view of the back of the lift 22. FIG. 3b illustrates the back of the lift 22 with the access panel 40 being removed to show certain internal components located in an upper portion of the main housing 38. In FIG. 3b, a lower portion of the main housing 38 is also cut away to show certain internal components located in the lower portion of the main housing 38. The lift 22 will generally include a lift control system that comprises a core lift control processor (not shown), lift control components, one or more sensors, and a transceiver 42. The lift 22 may also include an electrical power supply for powering the lift, which broadly comprises one or more rechargeable batteries 44, a battery charger 46, and a main power switch 48. Furthermore, the lift 22 may include a hydraulic power system for raising and lowering the lift actuator 36, which broadly comprises a hydraulic reservoir 50 and a hydraulic pump 52.

As mentioned above, each of the individual lifts 22 of the portable vehicle lift system 20 will be equipped with one of the lift control systems for controlling the functionality of the lift 22 in response to operator (i.e., user) commands. In some embodiments, the lift control system can include any type of computing device, such as any device, component, or equipment with one or more processors and/or associated memory elements. In certain specific embodiments, the lift control system will include the core lift control processor, which processes lift instructions for its associated vehicle lift 22. For example, the lift control processor will be used for processing information relating to and for controlling the lift control components and any of the sensors associated with its associated lift 22. The lift control components can include via various components, such as the lift actuator 36, a down-stop actuator, an emergency stop actuator, a hydraulic valve, and/or the hydraulic pump 58. The sensors can include a height sensor, a pressure sensor, an energy status sensor, a velocity sensor, an actuator position sensor, a camera, a radar/lidar sensor, an RFID sensor, and the like. In certain specific embodiments, the core lift control processor used for controlling the lift control components and the sensors will be a Freescale™ HC12D60.

Figure 4:
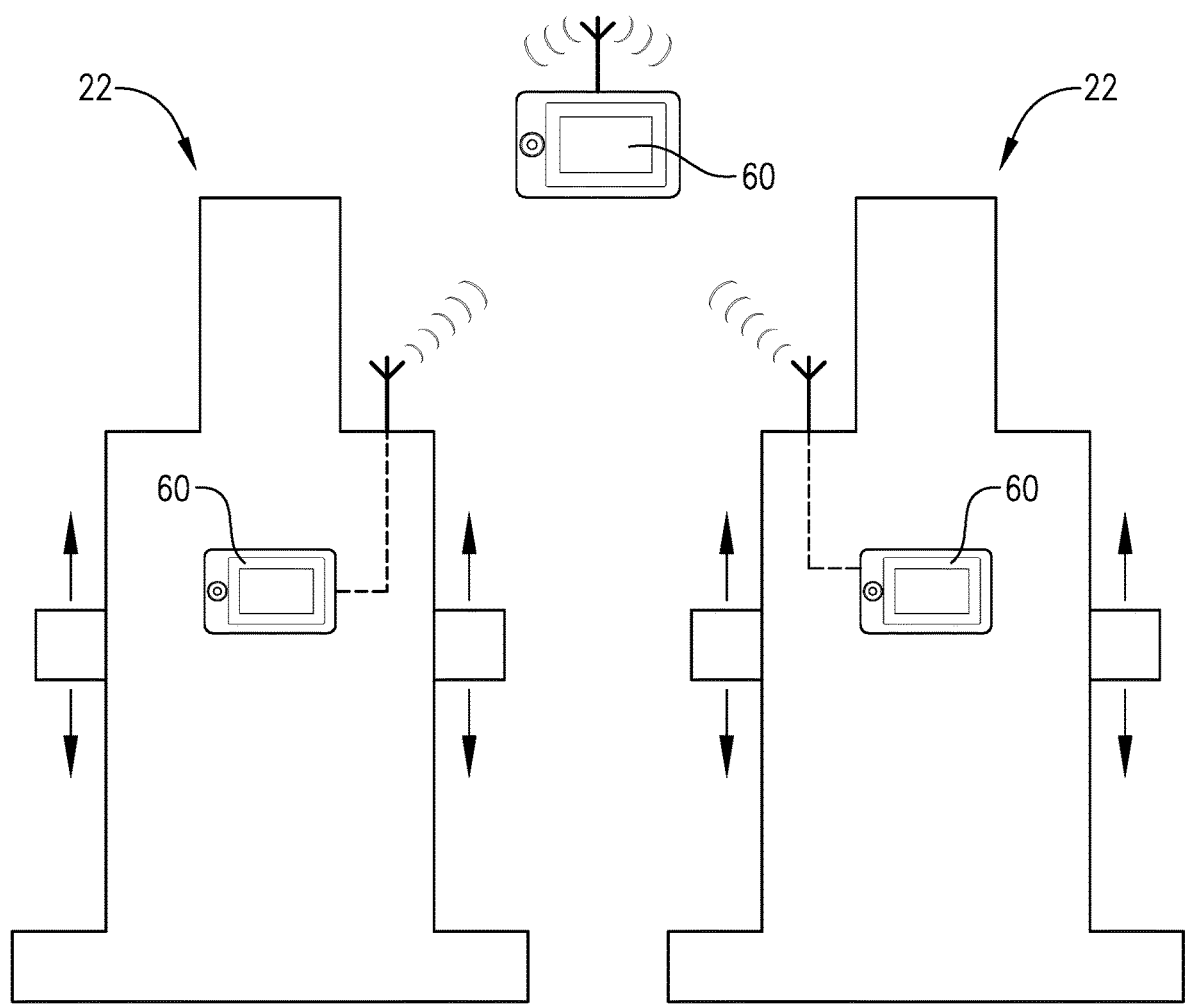
FIG. 4 is a simplified representation a lift control module configured to control two vehicle lifts.

In addition to the lift control system associated with each of the lifts 22, the vehicle lift system 20 may include one or more lift control modules 60 that, as illustrated in FIG. 4, are operable to control any one or more of the lifts 22 of the lift system 20 (e.g., via communication with the core lift control processors of the lifts' 22 lift control systems), as well as to perform independent functions, all of which will be described in detail below. In certain embodiments, the vehicle lift system 20 will include only a single lift control module 60 that is operable to control each of the lifts 22 as well as to perform independent functions. However, in other embodiments, the vehicle lift system 20 will include a plurality of lift control modules 60, each capable of controlling each of the lifts 22 as well as performing independent functions. For example, in certain embodiments, each of the individual lifts 22 will include its own lift control module 60. Regardless, as discussed in detail below, the lift control module 60 of the present invention will include an advanced operating platform that will allow the lift control module 60 to perform a plurality of functions in addition to providing operating instructions for the lifts 22.

Embodiments of the present invention provide for the lift control module 60 to comprise any type of computing device, such as any device, component, or equipment with a processor and/or associated memory elements. In certain embodiments, the lift control module 60 will comprise a computing device in the form of a work station, a desktop computer, a laptop computer, a palmtop computer, a tablet, a portable digital assistant (PDA), a smart phone, or the like, or combinations thereof. In certain preferred embodiments, as will be discussed in more detail below, the lift control module 60 will comprise a mobile communication device (i.e., a wireless devices), such as a tablet or a smart phone. In certain embodiments of the present invention, the lift control module 60 can be readily secured and detached from one of the individual lifts 22. When detached, the lift control module 60 can be used to wirelessly control each of the lifts 22 of the lift system 20, while the lift user is remote from the lift system 20.

In some embodiments, the lift control module 60 will have graphic display, such as a cathode ray tube, liquid crystal display, plasma, or touch screen that is operable to display visual graphics, images, text, etc. For example, the graphic display may comprise a monitor with a display size of at least 7 inches, at least 9 inches, or at least 10 inches. In other embodiments, the lift control module 60 may include a connection for an external monitor, such as HDMI, VGA, DVI, or other similar connection. In certain embodiments, the present invention facilitates interaction and communication with a user through a graphical user interface (GUI) that is displayed via the graphic display of the lift control module 60. The GUI enables the user to interact with the lift control module 60 by touching or point at display areas of the graphic display. For instance, the GUI may include a touchscreen in the form a capacitive digitizer, a resistive digitizer, or other similar touchscreen technologies. As will be described in more detail below, the graphic display of the lift control module 60 can include features that enable enhanced operating features of the lift system 20. For example, the graphic display can be programmed to display a real time animation of the lift positions and/or the vehicle position as the vehicle is being lifted and/or lowered by the lift system 20.

In additional embodiments, the lift control module 60 may include an optical device such as a digital camera, video camera, optical scanner, or the like, such that the lift control module 60 can capture, store, and transmit digital images and/or videos. In still further embodiments, the lift control module 60 may include one or more sensors from which the lift control module 60 can obtain data and information to facilitate various functions and features of the present invention. For example, such sensors may include gyroscopes, accelerometers, global positioning system (GPS) components, radio frequency identification (RFID) components, near field communication (NFC) components, or the like.

The lift control module 60 may, in additional embodiments, include a user control interface that enables one or more users to share information and commands with the lift control module. In some embodiments, the user control interface may comprise the GUI, which was previously described. In other embodiments, the user interface may comprise one or more functionable inputs such as buttons, keyboard, switches, scrolls wheels, voice recognition elements such as a microphone, pointing devices such as mice, touchpads, tracking balls, and styluses. The user control interface may also include a speaker for providing audible instructions and/or feedback to the user. Further, the user control interface may comprise wired or wireless data transfer elements, such as a communication component, removable memory, data transceivers, and/or transmitters, which enable the user and/or other computing devices to remotely interface with the lift control module 60.

Embodiments of the present invention provide for the lift control module 60 to communicate through various networks, with such networks being wired or wireless and may include servers, routers, switches, wireless receivers, transmitters, or transceivers (e.g., Bluetooth or WiFi), and the like, as well as electrically conductive cables or optical cables. The networks may also include local, metro, or wide area networks, as well as the Internet, Intranet, or other cloud networks. Furthermore, the networks may include cellular or mobile phone networks, as well as landline phone networks, public switched telephone networks, various radio frequency (RF) networks, fiber optic networks, serial networks (e.g., USB), or the like.

In some embodiments, the one or more processors included within the lift control module 60 may include standard processing elements, microprocessors, microcontrollers, field programmable gate arrays, and the like, or combinations thereof. In some embodiments, the lift control module 60 will comprise one or more single-core, dual-core, or quad-core processors configured for simultaneously processing a plurality of different computer programs and/or applications. For example, the processors of the lift control module 60 may include i386, ARM Cortex™, Texas Instruments™, Samsung, and/or Motorola™ processors. In certain specific embodiments, the processors may provide processing speeds of more than 80 MHz, more than 400 MHz, more than 800 MHz, more than 1.2 GHz, or more than 1.5 GHz. The processor of the lift control module 60 may be operable to implement operating systems, such as the advanced operating platform, and may generally be capable of executing computer programs, which are also commonly known as instructions, commands, software code, executables, applications, apps, and the like, which may all be stored on the memory elements of the lift control module 60.

The memory elements included within the lift control module 60 may be capable of storing or retaining computer programs, including the advanced operating platform, and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, memory cards, optical storage media such as compact discs (CDs or CDROMs), digital video disc (DVD), Blu-Ray™, and the like, or combinations thereof. In some embodiments, the memory elements included within the lift control module 60 of present invention will include a storage capacity of more than 8 MB, more than 500 MB, more than 1 GB, more than 4.0 GB, more than 6.0 GB, or more than 8.0 GB.

Figure 5:
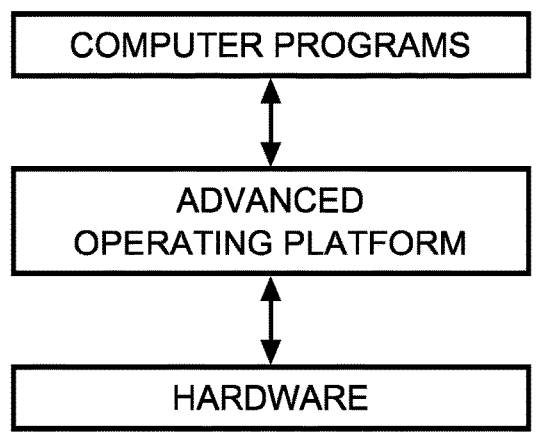
FIG. 5 is a flowchart illustrating certain embodiments of an advanced operating platform.

In certain embodiments, the lift control module 60 will include and implement the advanced operating platform, which is used for performing various functions and features that are not possible in previously-available vehicle lift systems. In certain embodiments, as illustrated in FIG. 5, the advanced operating platform comprises an operating system that serves (1) to facilitate operation and/or access to one or more computer programs included with the lift control module 60, and (2) to manage various independent resources and/or hardware components of the lift control module 60. In more detail, the advance operating platform will provide an interface between the computer programs that are run on the lift control module 60 and the lift control module's 60 hardware components. As such, the computer programs will interact with the hardware only as allowed via specific rules and procedures provided by the advanced operating platform. As an example, the execution of a computer program involves the creation of a computer process by a kernel of the advance operating platform, which (1) allocates and assigns memory space within the lift control module's 60 memory elements, (2) establishes priorities for computer program multi-tasking systems, and (3) initiates execution of the computer programs which then are configured to interact with the user and with hardware devices.

In some embodiments, the advance operating platform will be selected from one or more of the following operating systems: Android, iOS, OS X, UNIX, LINUX, Microsoft WINDOWS, BSD, QNX, Windows Phone, IBM z/OS, or the like. Nevertheless, it is expressly understood that other advance operating platforms may be used without departing from the scope of the present invention. Given that embodiments of the present invention include the ability to execute the advanced operating platform in the form of the above-described operating systems, the lift control module 60 is capable of executing mainstream, off-the-shelf software, such as may be generally available for use on smartphones, tablets, and other personal/commercial computing devices.

As mentioned above, the advanced operating platform is operable to facilitate multi-tasking by the lift control module 60. Such multi-tasking allows the lift control module 60 to execute multiple computer programs and/or applications simultaneously. As used herein, term application is understood to mean one or more sets of computer programs that function to carry out one or more specific task, functions, or features. The advance operating platform may be configured for either pre-emptive or co-operative multi-tasking. In pre-emptive multitasking, the advance operating platform allocates portions of processor time and dedicates one or more portions to each of the running applications. Contrastingly, in cooperative multi-tasking, each of the running applications allocates portions of their own processor time to the other applications in a manner defined by the advanced operating platform.

As such, users of embodiments of the present invention are thereby permitted to perform multiple, simultaneous tasks with the portable vehicle lift system 20. For instance, if a user is using a first application implemented on the lift control module 60 to communicate with and control the lift control system of each of the lifts 22 of the vehicle lift system 20, the user can simultaneously implement and use a second application on the lift control module 60 to perform a second task and/or function. As an example, the first application may allow the user to remotely operate (e.g., raise/lower) each of the vehicle lifts 22. Examples of second applications that can be simultaneously implemented and used are provided further below, but may include: accessing electronic resources (e.g., Internet, Intranet, and mobile apps.), displaying videos (e.g., training and/or instructional videos), lift or vehicle diagnostic applications (e.g., owner's manuals, how-to guides, and troubleshooting guides), lift data analysis applications, or any other type of application that the user wishes or is required to access. Thus, for example, while the user is operating one or more of the lifts 22 to lift a particular vehicle, via a first application of the lift control module 60, the user can simultaneously access the Internet to determine a required lift height information for the particular vehicle that is to be lifted. In some embodiments, the user may then use that height information to manually lift the vehicle, or alternatively, the height information may be directly accessed by the first application to automatically lift the vehicle to the height of the required lift height. As a further example, the user can access the Internet to determine specific vehicle service information (e.g., vehicle recall information), which may pertain to the vehicle being raised by the lift system 20. As such, the lift control module 60 can be used to obtain information wholly unrelated to the vehicle lift system 20, but that may be necessary for the user to correctly and/or efficiently complete his/her task.

Furthermore, the advanced operating platform is configured, in some embodiments, to allow the lift control module 60 to send and receive lift data and/or other information to and from one or more of the lifts 22. In addition, such lift data may be communicated between various applications executed on the lift control module 60. Such lift data may include any information related to the lifts 22 or the vehicle lift system 20, such as lift operational data, lift maintenance data, lift diagnostics data, or the like. For example, if a particular application being run on the lift control module 60 is collecting lift data from one or more of the lifts 22, such as a weight of the vehicle being lifted by the vehicle lift system 20, embodiments of the present invention provide for such lift data to be shared with and accessed by various other applications on the lift control module 60. Similarly, such lift data can be shared with and accessed by applications from separate computing devices and/or electronic resources, which may be connected to the lift control module 60, directly or indirectly, via the communications network. Thus, a user may log-in over the internet to access lift data that was collected and stored on the lift control module 60, or that was otherwise stored on a separate computing device or electronic resource (e.g., in the cloud).

In some embodiments, the advanced operating platform will be capable of accessing a plurality of electronic libraries, with each electronic library containing a collection of one more library program codes. As used herein, such library program codes comprise instructions, commands, software code, executables, applications, apps, and the like, which are capable of performing various programmed and/or predefined functions. Thus, for instance, if a user of the present invention is required to create an application for performing a certain function, the user will not be required to independently compose each line of code necessary to perform the certain function. Instead, the user can simply program the application to make certain "function calls" to the library (and to a particular library program code within the library), such that the application will implement the selected library program codes to perform the certain function. In some embodiments, the electronic libraries will be stored directly on the memory elements of the lift control module 60. In other embodiments, one or more of the sets of libraries may be stored remotely, such as in the cloud, for access by the lift control module 60 via the communications network.

In some embodiments, the advanced operating platform will include its own standardized set of electronic libraries. As such, embodiments of the present invention provide for a plurality of applications to be created based on library program codes included in these standardized libraries. Each of the applications developed and/or utilized by the user can include library program codes from the standardized set of electronic libraries, such that the applications will have standardized operability, look, and feel. For example, embodiments of the present invention may provide electronic libraries that facilitate the use of standardized functions features within applications, including, for instance, user interaction with a touchscreen (e.g., touching, swiping, pinching, etc.), use of the sensors inherent with the lift control module 60 (e.g., gyroscopes, accelerometers, GPS, RFID, camera, microphone, etc.), or displaying videos and/or sound within an application (e.g., video and sound codecs). Embodiments of the present invention provide for the advanced operating platform to provide access to such electronic libraries for users to implement such consistent functions and features within their own independently-developed applications. Examples of such independently-developed applications will be discussed further below.

In other embodiments, users of embodiments of the present invention can create their own unique electronic libraries, each with uniquely created library program codes. Upon the creation of such unique electronic libraries, users of embodiments of the present invention can create applications that make function calls to the library program codes in such libraries to perform unique functions associated with such codes. As such, users can create applications that can perform unique functions without being required to draft detailed and/or complex computer code each time the unique function needs to be implemented in an application. For example, if a user is programming an application that requires a viewing area to be displayed via the graphic display of the lift control module 60, the user can create a library program code that is operable to create such a window. As such, if the user is required to include a second viewing area in the same application or to include another viewing area in a different application, the user can simply make a function call to the library program codes instead of drafting the entire code each time the viewing area is needed.

In addition to the above, the advanced operating platform facilitates the management and operation of hardware and resources of the lift control module 60. For example, the advanced operating platform will facilitate communication by providing access to one or more of the lift control module's 60 available communications networks/ports, such as cellular, RF, Internet, Intranet, Wifi, Ethernet, Serial, USB, or the like. The advanced operating platform will also facilitate access to the lift control module's 60 memory elements (e.g., hard disks, memory cards, flash memory), user interface (e.g., display, touchscreen, keyboard, mouse), display attributes (e.g., resolution, refresh rates, display ratios, video attributes), and/or sound devices (e.g., speakers and audio synthesizers). The advance operating platform may further include a plurality of built-in codecs for audio (e.g., MPS, WAV, MPEG) and video (e.g., MPG, MKV, AVI, etc.). Furthermore, the advance operating platform may facilitate the operation and use of internal clocks, such that various applications can access and use actual time and date information.

As previously mentioned, embodiments of the present invention provide for the lift control module 60 to function remotely from, or integrated physical with, each of the lifts 22. In particular, as illustrated in FIGS. 3a and 3b, each lift 22 can be equipped with a docking station 62 that allows the lift control module 60 to be removably attached to the lifts 22. The docking stations 62 can be configured to allow for a quick physical connection and disconnection of the lift control module 60 to and from the lifts 22. One advantage provided by the docking stations 62 is that the lift control module 60 can be efficiently removed from the lift and replaced by another lift control module 60 if a problem with the lift control module 60 is experienced and/or if a new (or different) lift control module 60 is required. This avoids downtime and expense associated with having a service technician travel to the lift's 22 location to diagnose and repair a problem with the lift 22 or the lift system 20.

Further, the docking stations 62 can be configured to facilitate a wired, electrical connection between the lift control module 60 and the associated lift 22. The wired, electrical connection between the lift control module 60 and the lift 22 can permit various forms of wired communication, such as high-speed serial communication, between the lift control module 60 and the lift 22. As such, the lift control module 60 and the lift control system of the lift 22 can communicate via both a wired and wireless connections, so as to perform each of the various applications, functions, and feature described herein. Given the above, the lift control module 60 can be used to control the lifts 22 of the lift system 20 when the lift control module 60 is either attached to or detached from the lifts 22.

The wired, electrical connection between the lift control module 60 and the lifts can also allow for electrical charging of a battery of the lift control module 60 when the lift control module 60 is received on the docking station 62. In some embodiments, the lift control module 60 may be powered entirely from the lift 22, such as via the lift's 22 batteries 44. Additionally, in some embodiments, the wired, electrical connection will facilitate access to the plurality of sensors and/or components of the lift control module 60 by the core lift control processor of the lift 22. For example, as previously described, such sensors and/or component may include gyroscopes, accelerometers, thermometers, NFC components, or GPS components. Alternatively, the wired, electrical connection will facilitate access to the plurality of sensors and/or components of the lift 22 by the core lift control module 60. For example, such sensors and/or component may include, as previously described, cameras, position sensors, radar/lidar sensors, GPS components, or the like. Furthermore, the wired, electrical connection may allow for the lift 22 to communicate with and transfer data between the lift control module 60. For example, in some embodiments, the lift control module 60 may be configured to directly obtain lift data from the lift 22 via the wired, electrical connection.

Operation

Embodiments of the present invention, and specifically the advance operating platform, provide for the lift control module 60 to quickly boot-up, or become operational, from an inactive and/or a deactivated state. As such, the lift control module 60 can quickly be used to control the lifts 22 of the lift system 20, such as through a first application, or to execute and/or perform other functions, features or operations, such as through various second applications, as will be further described below.

In more detail, general purpose computing devices generally require a significant amount of boot-up time when transitioning from a deactivated state to an operational state. Embodiments of the present invention overcome such boot-up inefficiencies by providing for the lift control module 60 (including the processing elements of the lift control module 60) to be maintained in various categories of sleep modes, as opposed to being completely deactivated. While in such sleep modes, only certain portions of the lift control module 60 are deactivated, while other portions remain active and/or operational. Such sleep modes may be controlled the advanced operating platform, which functions to dynamically allocate/de-allocate processing time, memory space, and/or hardware/device driver functionality. As such, while in the various sleep modes, the lift control module 60 is operable to reduce power consumption while maintaining the ability to quickly enter into an operational state from an inactive or deactivated state.

Specifically, embodiments of the present invention provide for the lift control module 60 to enter a light sleep mode, in which the graphic display, including all of its associated hardware, are deactivated. In such a state, the graphic display of the lift control module 60 will not consume electrical power, so as to preserve the electrical charge of the battery of the lift control module 60 and/or the lift 22 to which the lift control module 60 may be attached (i.e., through the docking station 62). Furthermore, with the graphic display deactivated, the processor(s) of the lift control module 60 will not need to allocate processing power to the graphic display, thereby reducing electrical consumption. Nevertheless, because the remaining hardware of the lift control module 60 is still active and/or operational, the lift control module 60 can be quickly activated from the light sleep mode to a fully operational state by simply activating the graphic display (and any associated hardware).

Additionally, embodiments of the present invention provide for the lift control module 60 to enter a deep sleep mode, in which a significant portion of the hardware of the lift control module 60 is deactivated. For instance, in the deep sleep mode, the graphic display, the communications networks, and/or the processor and memory elements may be deactivated by the advanced operating platform. In more detail, in embodiments in which the lift control module 60 includes a plurality of processors or processing elements (e.g., dual-core/quad-core processors), one or more of the processors and/or portions of the processing elements may be deactivated, while at least one of the processors and/or portions of the processing elements remains operational. As such, the lift control module 60 will consume a reduced amount of electrical power, so as to preserve the electrical charge of the battery of the lift control module 60 and/or the vehicle lift 22 to which the lift control module 60 may be attached (i.e., through the docking station 62). Nevertheless, because portions of the remaining hardware of the lift control module 60 remain active (e.g., certain processors and/or certain portions of the processing elements, other hardware, and other firmware), the lift control module 60 can be activated from the deep sleep mode to the operational state in a quick and efficient manner by reactivating all of the deactivated hardware.

Figure 6:
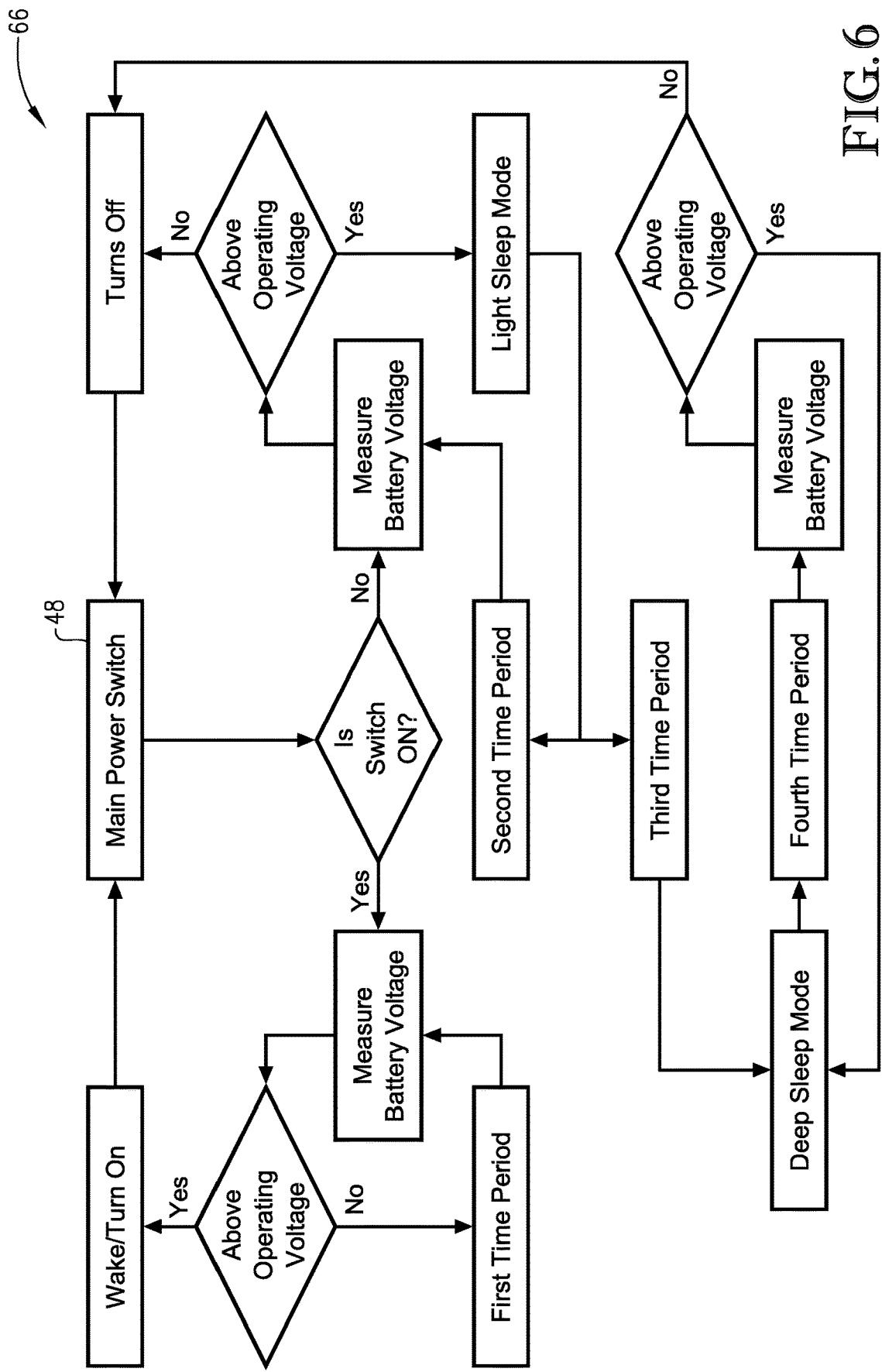
FIG. 6 is a flowchart of a process for operating the lift control module according to embodiments of the present invention.

Given the above, and as illustrated by FIG. 6, embodiments of the present invention include a method 66 for reducing the electrical power consumption of the lift control module 60 while maintaining the ability for the lift control module 60 to become operational in a quick and efficient manner. With the lift control module 60 secured to one of the lifts 22 of the lift system 20 (e.g., via the docking station 62), a first portion of the method 66 is performed with the main power switch 48 of the lift 22 in the "ON" position, such that the lift control module 60 is being powered and/or charged by the battery 44 of the lift 22. As such, in a first step, the lift control module 60 will measure (e.g., via a voltmeter included within the lift control module 60) a voltage of the lift's 22 battery 44. If the measured voltage is above an operating voltage, then the lift control module 60 will activate from a sleep mode or from an inactive state (i.e., an "OFF" state). The operating voltage of the battery 44 may vary depending on the requirements of the lifts 22 and the lift system 22; however, in certain embodiments, the operating voltage will be above 9 volts, above 10 volts, above 11 volts, above 12 volts, or above 13 volts, and/or not more than 18 volts, not more than 17 volts, not more than 16 volts, not more than 15 volts, or not more than 14 volts. If the measured voltage is below the operating voltage, then the lift control module 60 will not activate from the sleep mode or the inactive state. Instead, the lift control module 60 will periodically measure, according to a first time period (e.g., every 15 minutes, every 30 minutes, every 1 hour, every 2 hours, etc.), the voltage of the battery 44 and will remain in a sleep mode and/or a deactivated state until the voltage of the battery 44 has reached or has exceeded the operating voltage.

Continuing with the method illustrated in FIG. 6, with the main power switch 48 of the lift 22 in the "OFF" position, the method 66 will again include the step of the lift control module 60 measuring the voltage of the battery 44 of the lift 22. If the voltage of the battery 44 is below the operating voltage, as defined above, the lift control module 60 will entirely deactivate (i.e., turn "OFF"). If the voltage of the battery 44 is above the operating voltage, then the lift control module 60 will enter the light sleep mode, as described above. As such, the lift control module 60 will consume less electrical power from the battery 44, but the lift control module 60 will still be capable of becoming operational (i.e., waking from the light sleep mode) in a quick and efficient manner. While in the light sleep mode, the method 66 includes a next step of having the lift control module 60 periodically measure, according to a second time period (e.g., every 1 minute, every 5 minutes, every 15 minutes, 1 hour), the voltage of the battery 44. If the measured voltage is below the operational voltage, the lift control module 60 will entirely deactivate. If the voltage is above the operational voltage, the lift control module 60 will remain in the light sleep mode.

Furthermore, after the lift control module 60 has been in the light sleep mode for a third time period (e.g., 15 minutes, 30 minutes, 1 hour, 2 hours, etc.), the lift control module 60 will enter the deep sleep mode, as was described above. As such, the lift control module 60 will consume a significantly reduced amount of electrical power from the battery 44, but the lift control module 60 will still be capable of becoming operational (i.e., waking from the deep sleep mode) in a quick and efficient manner. While in the deep sleep mode, the lift control module 60 will periodically, according to a fourth time period (e.g., every 15 minutes, every 30 minutes, every 1 hour, every 2 hours, etc.), measure the voltage of the battery 44. If the measured voltage is below the operational voltage, the lift control module 60 will entirely deactivate. If the voltage is above the operational voltage, the lift control module 60 will remain in the deep sleep mode. Furthermore, it should be understood that at any time the lift control module 60 is in a sleep mode, if the main power switch 48 of the lift 22 is turned from the "OFF" position to the "ON" position, then the lift control module will activate from the sleep mode if the voltage of the battery 44 is above the operational voltage.

As such, the light and deep sleep mode features of embodiments of the present invention provide for the lift control module 60 to efficiently consume only as much electrical power as is necessary for efficient operation of the lift control module 60 and the lifts 22 of the lift system 20. Nevertheless, even with such efficient electrical consumption, embodiments of the present invention allow for the lift control module 60 to be activated from a deactivated or from a sleep mode in a quick and efficient manner.

Embodiments of the present invention may include additional functions and features for reducing the lift control module's power consumption while maintaining quick and efficient boot-up times. For example, in certain embodiments, the lift control module 60 will only be configured to perform a single function, such as only to control the lifts 22 of the lift system 20. Such an embodiment may be configured as a specialized and/or customizable read-only-memory ("ROM") application, firmware, hardware, or a quick-boot application for the lift control module 60. As such, when the lift control module 60 is activating from an deactivated state or from a sleep mode, only the software and/or hardware components required to control the lifts 22 will need to be executed and/or active for the lift control module 60 to become fully activated. In further embodiments, an application (i.e., a first application) for controlling the vehicle lifts 22 may automatically execute upon the lift control module 60 being activated from the deactivated state or from the sleep mode.

Figure 7:
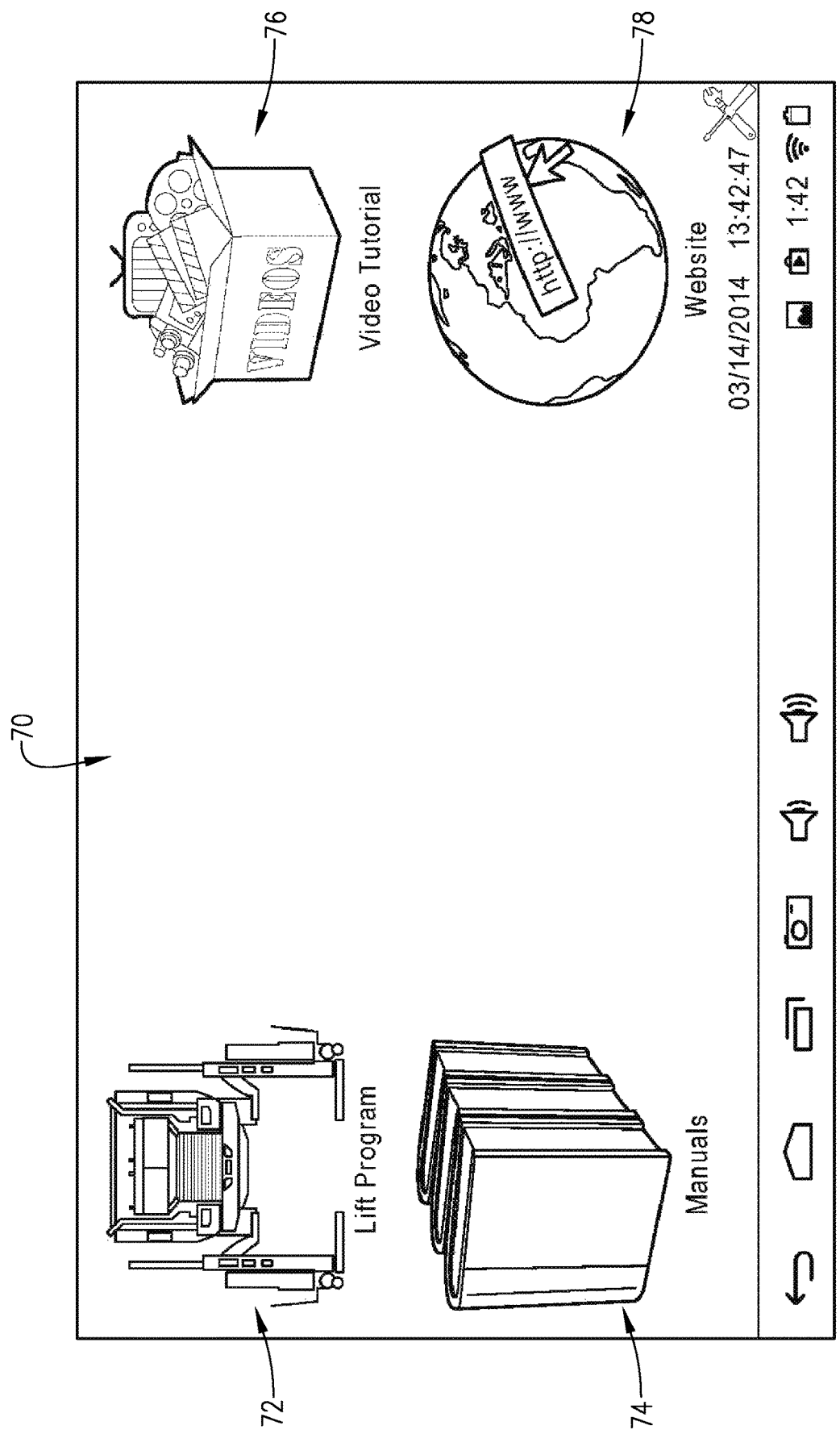
FIG. 7 is a graphical representation of a Menu Screen presented on a graphical user interface of the lift control module from FIGS. 1 and 4.

As previously discussed, the lift control module 60 is operable to run a plurality of applications, including a first application that can be used to control one or more of the lifts 22 of the lift system 20 and a second application to access any of the other functions and features of embodiments of the present invention as described herein. In operation, as Illustrated by FIG. 7, the lift control module may display a Menu Screen 70, via the GUI, that allows the user to select to execute and run a plurality of applications, including the first application (i.e., Lift Program 72) and/or one or more second applications (e.g., Manuals 74, Video Tutorials 76, and Website 78). As such, the Menu Screen 70 may be in the form of an individual home screen application or a launcher screen application that executes and runs by way of the advanced operating platform on the lift control module 60. The Menu Screen 70 may automatically execute and run upon the boot-up of the lift control module 60. Embodiments of the present invention may provide for the Menu Screen 70 to be configured to allow access to one or more of the plurality of applications, such as the first application (i.e., Lift Program 72) and/or one or more second applications (e.g., Manuals 74, Video Tutorials 76, and Website 78). If additional applications are developed, the Menu Screen 70 can be programmed to provide access to any one or more of such additional applications. Furthermore, certain embodiments may provide for various other third-party applications to be downloaded to the lift control module, such that those applications may also be executable via the Menu Screen 70.

Additionally, in some embodiments, the Menu Screen 70 may restrict access to certain functions and features of the lift control module 60 that have not been explicitly made available via the Menu Screen 70. For example, users of the lift control module 60 may be restricted from accessing and manipulating important setting and configurations of the lift control module 60, such as network settings, software/firmware settings, download/installations/deletions of applications, or the like. Such restrictions may be enforced by not allowing the user to exit the Menu Screen 70, other than for accessing the first application (i.e., Lift Program 72) and/or one or more second applications (e.g., Manuals 74, Video Tutorials 76, and Website 78). Additionally, some embodiments may provide for the Menu Screen 70 to restrict users from downloading certain types of applications, such as third-party applications, to the lift control module 60. As such, users will be prevented from downloading, executing, and running unauthorized applications on the lift control module 60. Such restrictions may be beneficial for preventing applications unrelated to lifting operations from be executed on the lift control module 60. Furthermore, damage causing viruses and malware can be prevented from being installed on the lift control module 60. Embodiments of the present invention may provide for certain administrative-type user of the lift control module 60 to establish and manage the preferences for determining which, if any, third-party applications can be downloaded and/60 executed on the lift control module 60. General users of the lift control module 60 will not be permitted to access or to make changes to such preferences.

Figure 8:
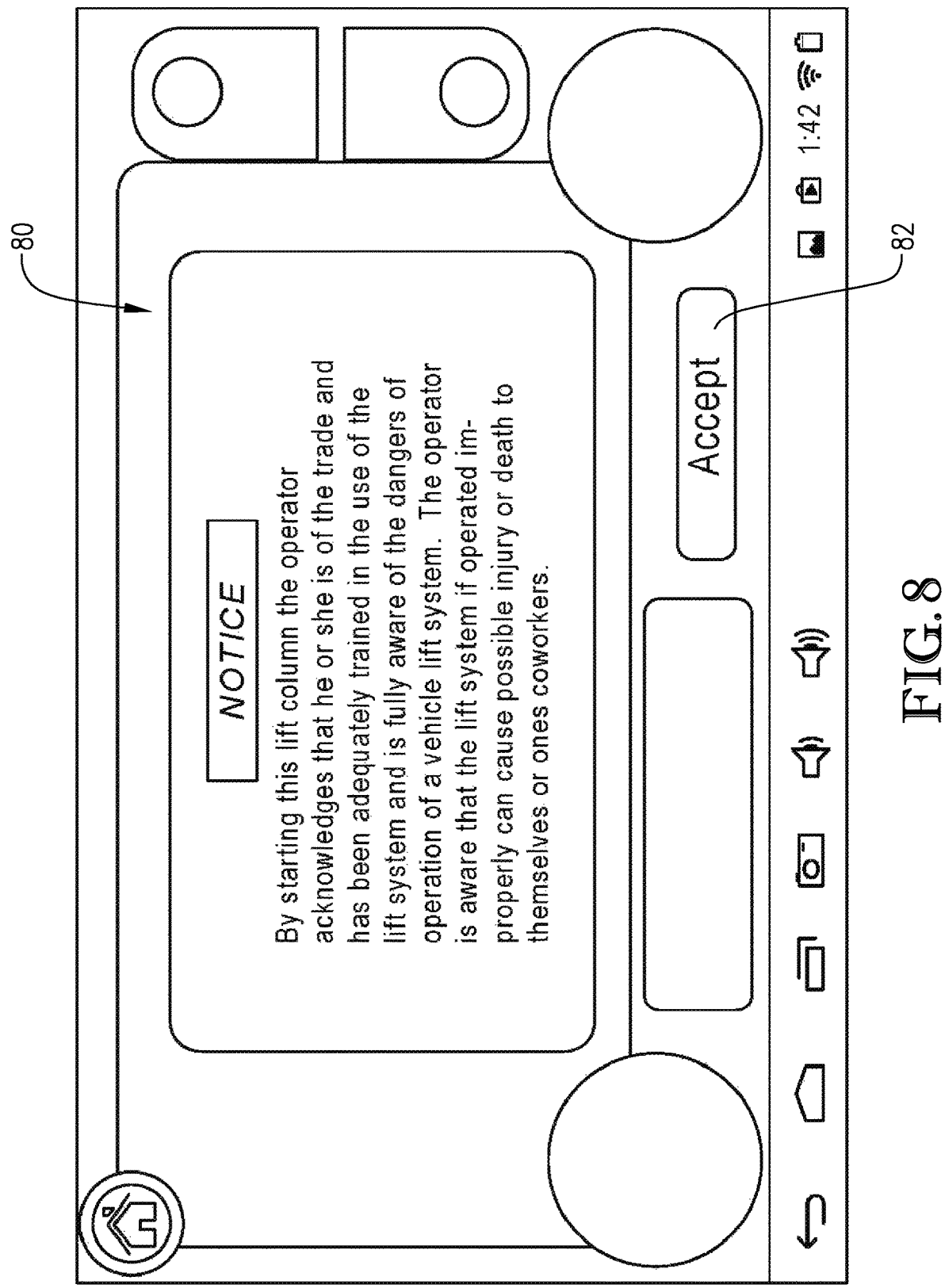
FIG. 8 is a graphical representation of a Lift Number Screen of a Lift Program presented on a graphical user interface of the lift control module from FIGS. 1 and 4.

As shown in FIG. 7, each of the applications displayed on the Menu Screen 70 may be presented as a button and/or icon that can be selected by the user via the GUI. To operate the lifts 22 of the vehicle lift system 20, a user may execute the Lift Program 72, such that the Lift Program 72 is executed via the advanced operating platform of the lift control module 60. Regardless, before the user has complete access to all of the features of the Lift Program 72, some embodiments of the present invention may provide for one or more safety features to be satisfied. For example, in some embodiments, the Lift Program 72 will include an authentication feature, which requires a user to sign-in and verify the user's identity. Such authentication feature may include username and password verification. In other embodiments, the authentication feature may utilize biometric authentication, such as voice authentication, finger print scan, iris scan, or the like. Such biometric authentication may use hardware associated with the lift control module 60, such as the microphone, camera, or the like. Additionally, in some embodiments, before a user can begin operating the lifts 22, the GUI may display a Disclaimer Screen 80, as shown in FIG. 8, which displays a written disclaimer and risks associated with operating the lifts 22. To advance beyond the Disclaimer Screen 80, the user must select a verification button 82 (e.g., an Accept button), which indicates that the user has read the disclaimer and assumes the risk of operating the lifts 22. In some embodiments, the user must also verify, via the verification button 82, that the user has been properly trained for using the lifts 22.

Figure 9:
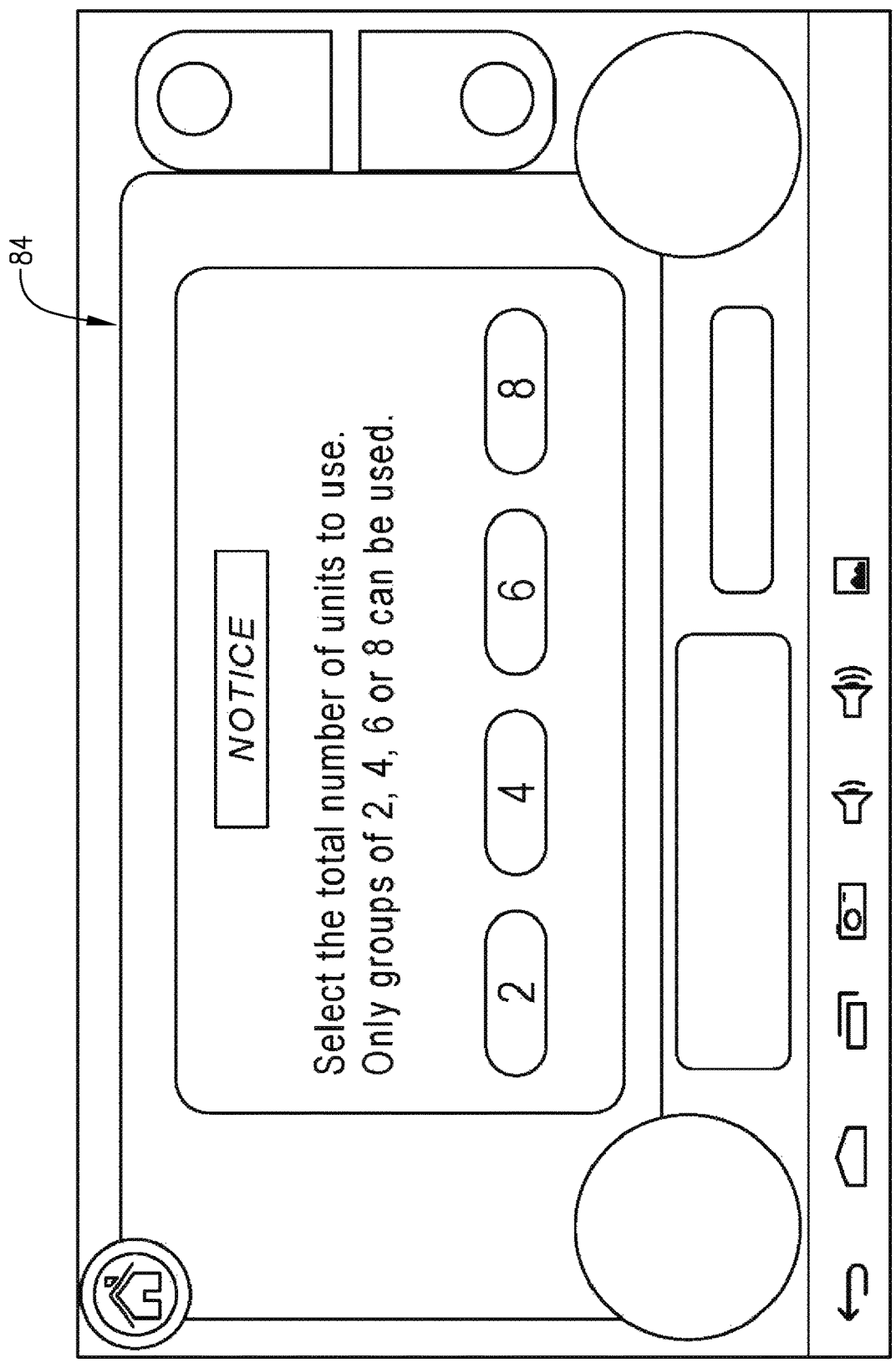
FIG. 9 is a graphical representation of a Position Selection Screen of a Lift Program presented on a graphical user interface of the lift control module from FIGS. 1 and 4.

Once the user has assented to the information displayed on the Disclaimer Screen 80, embodiments of the present invention may provide for Lift Program 72 to be configured with a particular arrangement of lifts 22 from the vehicle lift system 20. For example, as illustrated in FIG. 9, the GUI may display a Lift Number Screen 84, which prompts the user to select how many lifts 22 are included within the vehicle lift system 20 and how many lifts 22 will be controlled by the Lift Program 72. Specifically, for example, embodiments may provide for the vehicle lift system 20 to include a plurality of lifts, and from the plurality, any of 2, 4, 6, 8, or more vehicle lifts 22 may be assigned to the Lift Program 72.

Figure 10:
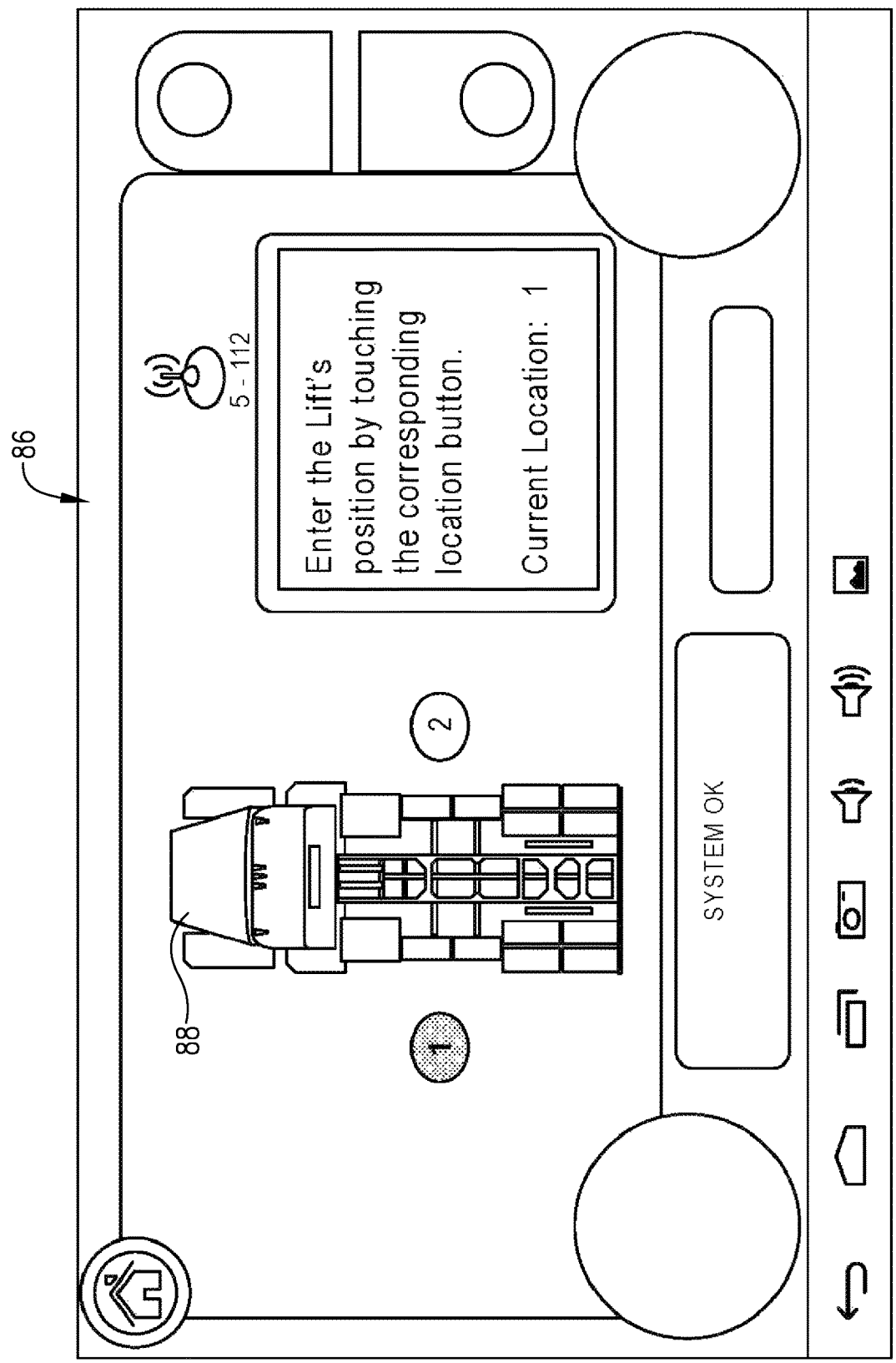
FIG. 10 is a graphical representation of a Position Selection Screen of a Lift Program presented on a graphical user interface of the lift control module from FIGS. 1 and 4.

Once the user selects how many lifts 22 are to be controlled by the Lift System, the GUI may display a Position Selection Screen 86, as shown in FIG. 10, which allows the user to indicate a position of each of the lifts 22 in the vehicle lift system 20 and that are to be controlled by the Lift Program 72. For example, in the embodiments illustrated in FIG. 10, which include two lifts 22, the user may indicate that a first lift 22 is positioned on a left side of the graphically depicted vehicle 88. Such an indication may comprise a highlighted icon (e.g., a colored icon) on the left side of the graphically depicted vehicle 88. Next, the user may indicate that a second lift 22 is positioned on a right side of the graphically depicted vehicle 88. It is understood that such indications on the graphically depicted vehicle 88 are representative of actual lift 22 positions about on an actual vehicle that is to be lifted with the lifts 22 of the vehicle lift system 20.

Figure 11:
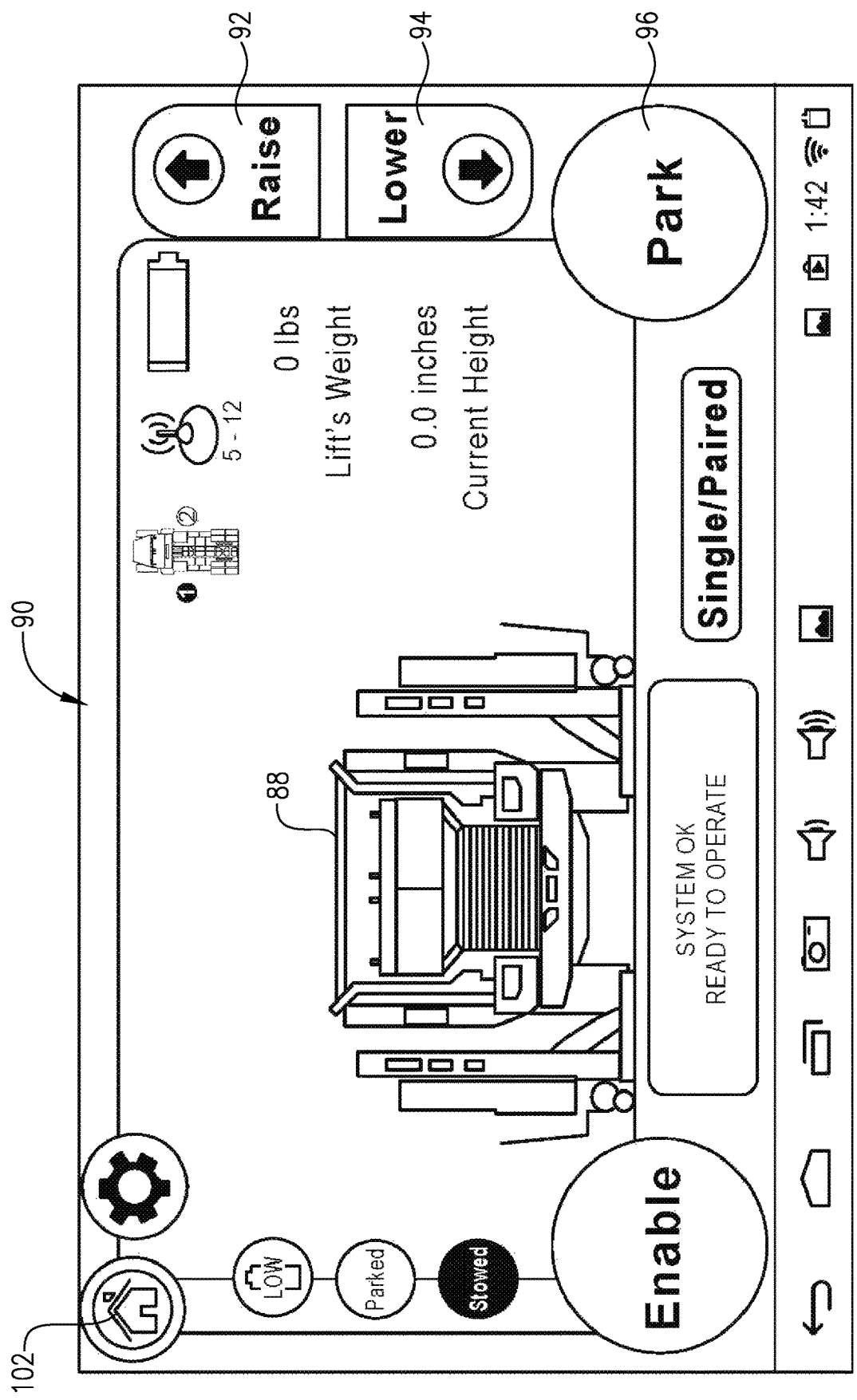
FIG. 11 is a graphical representation of a Main Operations Screen of a Lift Program presented on a graphical user interface of the lift control module from FIGS. 1 and 4.

Upon setting the each of the lift's 22 positions, via the Position Selection Screen 86, embodiments provide for the user to choose whether to control any one of the lifts 22 individually (i.e., single mode), or to control any set of two or more of the lifts 22 of the vehicle lift system 20 collectively (i.e., paired mode). Once the user has selected whether to control one or more of the lifts in either the single mode or paired mode, embodiments provide for a Main Operation Screen 90 to be displayed via the GUI, as illustrated by FIG. 11. The Main Operation Screen 90 allows the user to use the lift control module 60 to control each of the lifts 22 of the lift system 20. In some embodiments, the Main Operation Screen 90 of the Lift Program 72 will display control buttons necessary to control the lifts 22. For instance, such representations may include a raise button 92 and a lower button 94 that allow the user to manually raise and lower the one or more selected lifts 22. During lifting operations, the GUI can display a current lifting weight of the one or more selected lifts 22 (as determined by weight sensors of the lifts 22) and/or a current height of the one or more selected lifts 22 (as determined by height sensors of the lifts 22). In additionally embodiments, the Lift Program 72 may display, via the GUI, a real time animation of the lifts' 22 positions and/or the vehicle's position as the vehicle is being lifted and/or lowered by the lifts 22 of the lift system 20. For example, as illustrated by FIG. 11, the graphically displayed vehicle 88 may be displayed in various heights, which represent actual heights of the vehicle being lifted by the lifts 22. Once an intended height has been reached for the one or more selected lifts 22, embodiments may provide for the Main Operation Screen 90 to display a park button 96, which when selected, maintains the one or more selected lifts 22 at their current height.

Embodiments of the present invention additionally provide for the Lift Program 72 to include a frequent jobs feature. As such, users who use the Lift Program 72 to repetitively raise and lower the same type of vehicle to the same heights can store such specific height information and create a shortcut function within the Lift Program 72. The shortcut function will permit the user to automatically raise the selected one or more lifts 22 to the particular height with a single instruction (e.g., a button) presented via the GUI of the lift control module 60. In other embodiments, the lift control module 60 will include shortcut functions in the form of one or more pre-selected heights. As such, a user can provide a single instruction, via the GUI of the lift control module 60, to automatically direct the one or more lifts 22 to rise to one or more pre-selected heights.

Figure 12:
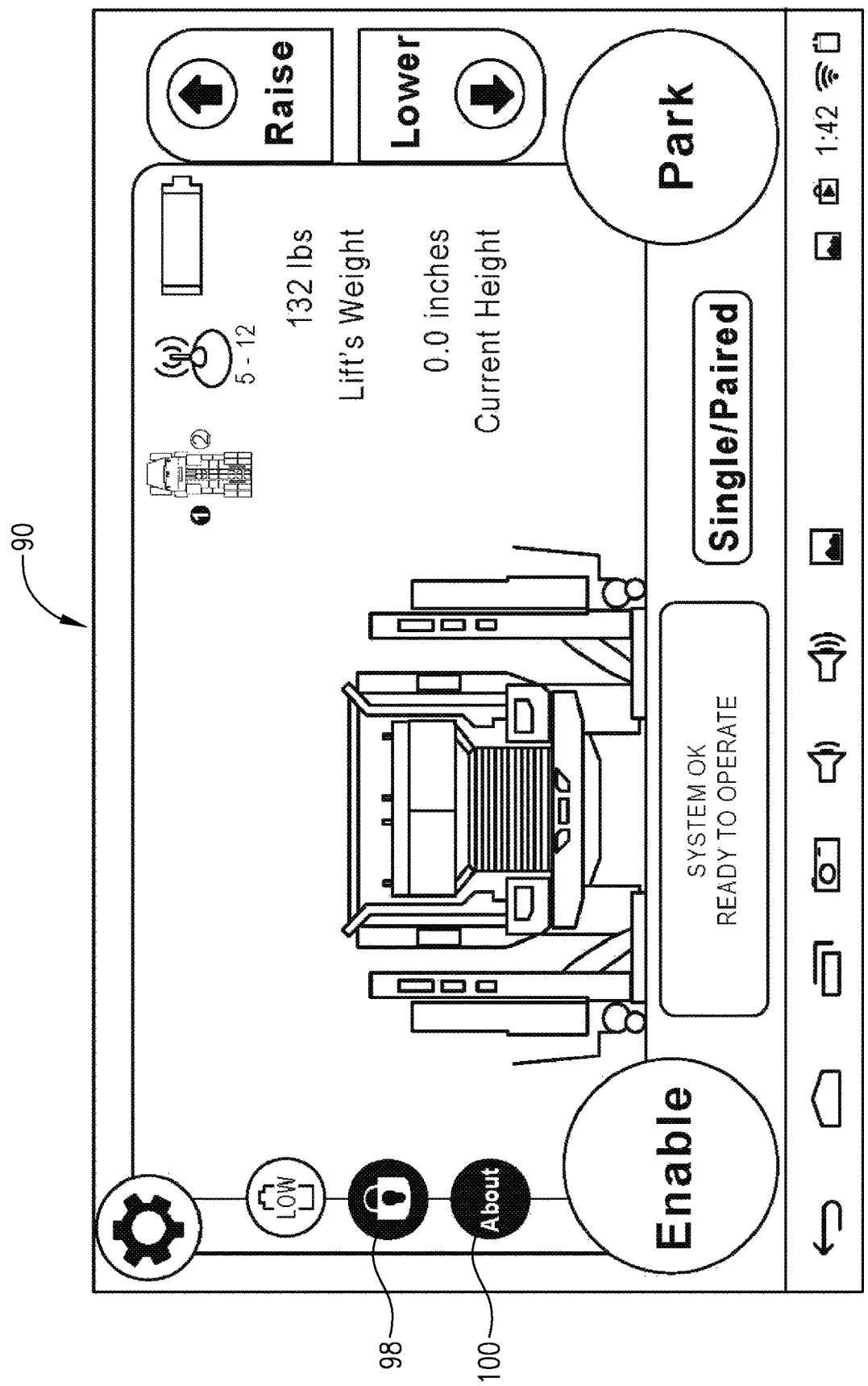
FIG. 12 is an additional graphical representation of a Main Operation Screen of a Lift Program presented on a graphical user interface of the lift control module from FIGS. 1 and 4.

After using the one or more lifts 22 of the lift system 20, a user can use the lift control module 60 to lower the selected one more of the lifts 22. In some embodiments, the Main Operations Screen 90, via the GUI of the lift control module 60, will display an Auto Return Button (not shown), which when selected, causes the selected one or more lifts 22 to return to a height level of the remaining lifts 22 in the lift system 20. For example, if a single lift 22 is being operated (i.e., single mode) by the Lift Program 72 of lift control module 60, the single lift 22 can be lifted to a height that is greater than a height that is being maintained by the remaining lifts 22 in the lift system 20. Once the user no longer requires the single lift 22 to be at such a height, the user can select the Auto Return Button to automatically cause the single lift 22 to return to the height of the remaining lifts 22. Similarly, the Lift Program 72 will include the capability of directing each of the selected lifts 22 to lower from any height to a stowed position (i.e., the ground position), with only a single instruction. Such a single instruction may comprise the selection by the user of a Stowed Button (not shown) displayed on the Main Operations Screen 90, via the GUI of the lift control module 60. Furthermore, certain embodiments of the present invention may incorporate one or more safety features within the Main Operation Screen 90 of the Lift Program 72. For example, as shown in FIG. 12, the GUI may present a lock button 98, which when selected completely or partially stops all functionality of the Lift Program 72 until a user verifies their identity via the authentication feature, such as a username and password. As such, when the lock button 98 has been selected, the Lift Program 72 restricts access to and operability of the one or more selected lifts 22 until the user's identity has been verified.

In addition to the above-described functionality, the Lift Program 72 is also configured to display a plurality of lift information to the user of the lift control module 60. The Main Operations Screen 90, via the GUI of the lift control module 60, may display a battery voltage level of the lift control module 60 or of the selected one or more lifts 22. The battery level may indicate when the battery voltage level is one-fourth, one-half, three-fourths, or fully charged. In addition, the Lift Program 72, via the GUI, may provide an alert when the battery voltage level is significantly low (e.g., less than one-fourth charged). The Lift Program 72, via the GUI, may also indicate the communication network that is currently being used to communicate with the one or more selected lifts 22. For example, the Lift Program 72, via the GUI, may indicate that the lift control module 60 is communicating with the lifts 22 via WiFi, RF, cellular, or the like. In embodiments in which an RF communication network is being used, the Lift Program 72, via the GUI, may indicate the channel and/or sub-channel that is/are being used. Additional embodiments may provide for the Lift Program 72, via the GUI, to display an about button 100, which when selected, displays contact information about the owner of the Lift Program 72, the software version(s) of the Lift Program 72, or the like.

In some embodiments, it may be preferable for the Lift Program 72 to be continuously running during operation of the lift control module 60. As such, embodiments provide for the lift control module 60 to automatically execute the Lift Program 72 when the lift control module 60 is first powered on and booted-up such that the Menu Screen 70 is bypassed. In additional embodiments, the lift control module 60 may periodically perform a systems check to determine if the Lift Program 72 is running. If the Lift Program 72 is not running, the lift control module 60 may automatically execute (i.e., restarting) the Lift Program 72. Additionally, as will be described in more detail below, certain embodiments may provide for the Lift Program 72 to be the only application that can be run from lift control module 60, such that certain users are unable to access any other second applications.

Embodiments of the present invention additionally ensure that the lift control module 60 is able to execute and run the most current, up-to-date version of the Lift Program 72, other second application, and/or the advance operating platform. As such, the lift control module 60 may include a feature that will update the software, firmware, or source code associated with the lift control module 60 on a periodic basis, or when manually instructed by the user. In some embodiments, the user will receive a notification, via the GUI of the lift control module 60, email, SMS message, or the like, when such an update is available. Regardless, updates can be performed via the Internet (e.g., Internet downloads, email, file transfer protocol, or the like), wireless networks, memory cards (e.g., SD-card), communication cables, or the like. Further embodiments may provide for the software or firmware of the lift control system of each of the lifts 22 of lift system 20 to be updated via the lift control module 60. Such updates may be performed wirelessly, via the communications network, or through the wired, electrical connection of the docking station 62.

As previously discussed, embodiments of the present invention allow for users to efficiently create a plurality of applications that can be executed and run via the lift control module 60. For example, the Lift Program 72 (i.e., the first application) illustrated by FIGS. 8-12, can be created through the use of library program codes included in the electronic libraries of the advance operating platform. As such, the appearance, features, and functionality included in the Lift Program 72 can be created by a user in an efficient manner by incorporating the library program codes from the electronic libraries, instead of independently drafting software code for each portion of the appearance, features, and functionality of the Lift Program 72. Nevertheless, it is understood, however, that the library program codes can be used in any of the first application or second applications used by the lift control module 60. Additionally, the advance operating platform can facilitate interaction between various applications and the lift control module's 60 hardware components. For example, while using the Lift Program 72, the advance operating platform may facilitate control of the one or more selected lifts 22 via instructions provided audibly (e.g., voice commands) via the microphone of the lift control module 60. For example, instead of being required to select the raise or lower buttons 92, 94, as illustrated in FIG. 11, to raise or lower the one or more selected lifts 22, the user may simply speak the words "Raise" or "Lower" into the microphone of the lift control module 60 to cause the lifts 22 to be raised or lowered.

Furthermore, as previously discussed, the advanced operating platform facilitates multi-tasking, which allows the lift control module 60 to execute and run multiple applications simultaneously. Examples of such applications that can be run simultaneously include the Lift Program 72 (i.e., the first application) and one or more of the second applications illustrated on the Menu Screen 70 illustrated in FIG. 7. For example, from the Menu Screen 70, the user can access the Manuals 74 program, which is a second application that provides access to one or more user's, owner's, or instruction manuals (the "manuals"). Such manuals may be used by the user of the lift control module 60 to gain information on how to operate the lifts 22 of the lift system 20 or the lift control module 60. In some embodiments, such manuals may include information about various vehicles that are to be lifted with the lift system 20. For example, the manuals may include weights of the vehicles, standard height requirements, or other such information related to the vehicles that are to be lifted. In some embodiments, the manuals will be stored on the memory elements of the lift control module 60. In other embodiments, the manuals will be stored and accessible by the lift control module 60 from a remote storage location, such as from the cloud.

Figure 13:
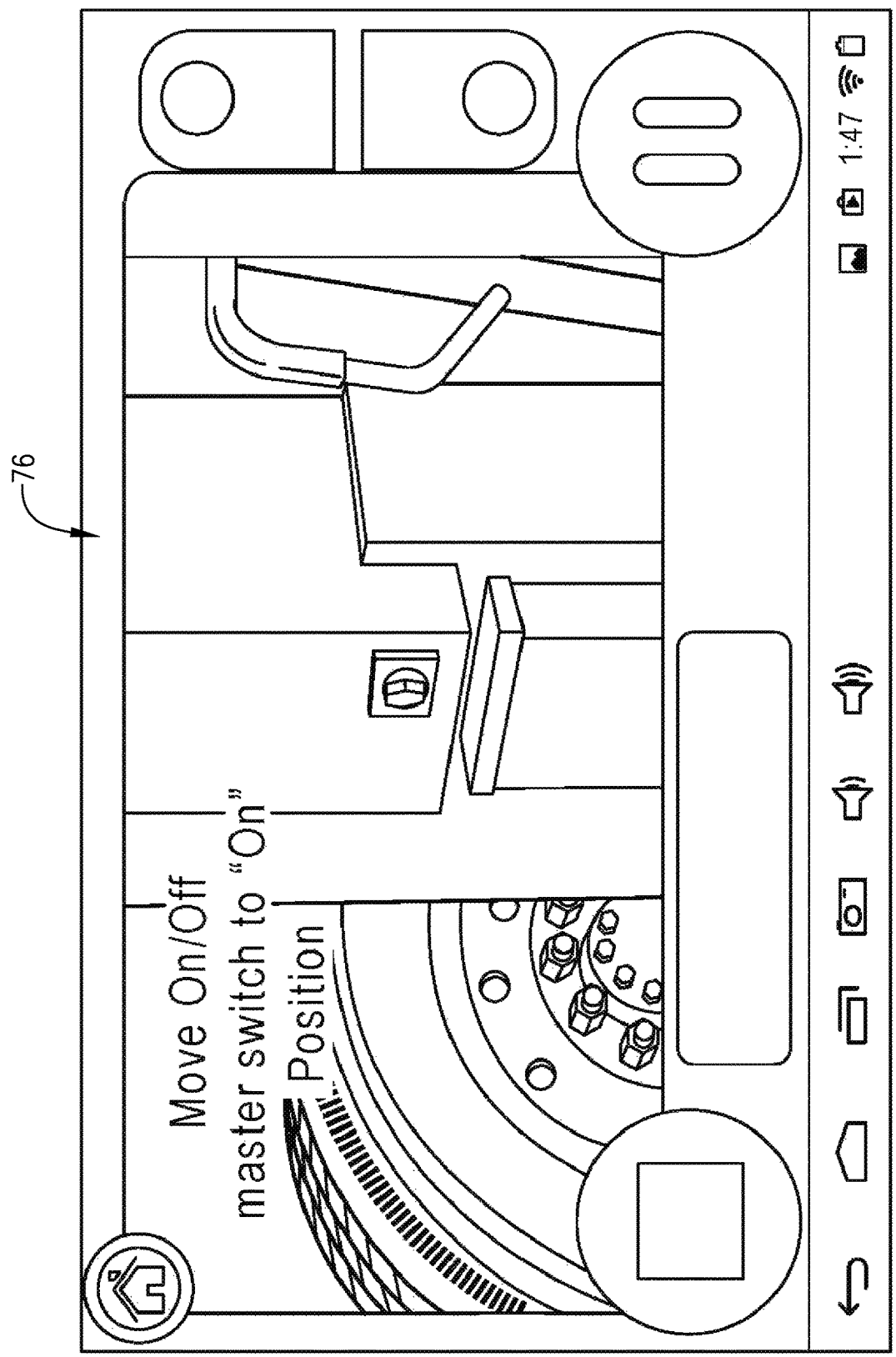
FIG. 13 is a graphical representation of a Video Tutorials program presented on a graphical user interface of the lift control module from FIGS. 1 and 4.

In addition, the user may also access the Video Tutorials 76 program, as illustrated in FIG. 13, which is a second application that provides access to one or more instructional videos that can be displayed on the lift control module 60. As with the Manuals 74 program, the Video Tutorials 76 program can provide video-based information and instructions on how to operate the lifts 22, how to operate the lift control module 60, and/or other information about various vehicles that are to be lifted with the lift system 20. For example, as illustrated in FIG. 13, the Video Tutorials 76 program may include a physical demonstration on how to use the lifts 22 of the lift system 20 to raise a vehicle.

Figure 14:
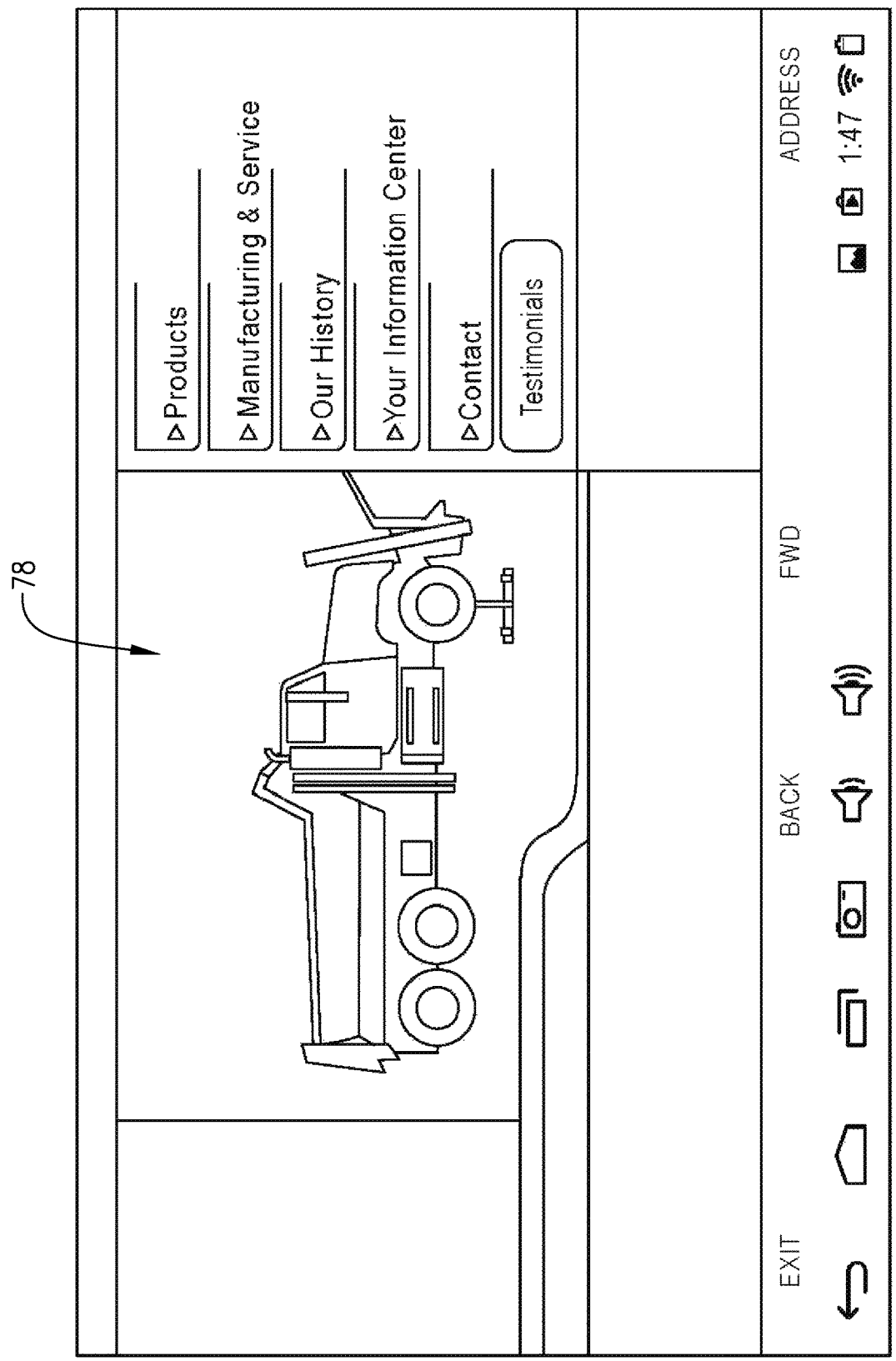
FIG. 14 is a graphical representation of a Website program presented on a graphical user interface of the lift control module from FIGS. 1 and 4.

Furthermore, the user may access the Website 78 program, such as illustrated in FIG. 14, which is a second application that allows the user to access the world-wide web (i.e., the Internet). As such, the user can research and investigate any type of information that may be necessary or helpful for carrying out the user's tasks. For example, as illustrated in FIG. 14, the Website 78 program may provide access to an online resource for obtaining information on the lifts 22 of the lift system 20. Additionally, the advanced operating platform facilitates the sharing of data and information between applications being executed on the lift control module 60. Thus, if the user is looking up vehicle lift height information on the Internet, via the Website program for instance, such information can be shared with the Lift Program for use lifting a vehicle during operation of the lift system 20.

As previously mentioned, in addition to those second applications just described (i.e., Manuals 74, Video Tutorials 76, Website 78), embodiments of the present invention may provide for the lift control module 60 to execute and run other types of second applications via the Menu Screen 70. In particular, some of such second applications may be developed internally, using the advanced operating platform. In other embodiments, some of such second applications may be third-party applications that can be downloaded onto the lift control module 60 for execution. An example of such a third-party application may include Adobe Acrobat Reader™, which is a text reader capable of being used to open and view certain types of text and graphic files. The Adobe Acrobat Reader™ application may be used, for instance, to open one or more of the manuals on the Manuals 74 program. Other types of third-party applications, such as texting/teleconferencing/videoconferencing applications (e.g., Skype™), web browser applications (e.g., Chrome, Internet Explorer, Firefox, etc.), printing applications, or various other type applications. Examples of other third-party and independently-developed second applications that can be executed via the lift control module 60 are provided below.

For instance, an additional second application of embodiments of the present invention may provide the user to make use of the lift control module 60 to accurately position one or more of the lifts 22 under a vehicle. Specifically, in certain embodiments, each of the lifts 22 will include a camera positioned on a front side of the lift 22. As previously described, the lift control module 60 may be configured to be secured to a back side of the lift 22 via the docking station 62. Because of the large size of the lift 22, it can be difficult for a user to direct and position the lift 22 in the correct position required to lift the vehicle. Embodiments of the present invention facilitate such correct positioning by including a second application, executable by the lift control module 60, that accesses and displays images and/or videos obtained from the camera of the lift 22. Specifically, the user can maneuver the lift 22 from the back side of the lift 22, where the user can view the graphic display of the lift control module 60. Nevertheless, because the real-time images and/or video from the lift's 22 camera are taken from the front of the lift 22, the user can easily see where the lift 22 is being maneuvered. As such, the user can use such real-time image/video data to correctly position the lift 22 with respect to the vehicle. In other embodiments, the second application can use the GPS, radar, lidar, and/or RFID sensors to correctly position the lifts 22 with respect to a vehicle.

In certain embodiments, the second application may allow the user to access various documents that are required to be completed when repairing a vehicle. Such documents may include Department of Transportation and PM sheets. As such, the user can fill out such documents with the user input of the lift control module 60 via a second application. Upon completion, embodiments provide for the lift control module 60 to be electrically connected, wirelessly or hard-wired, to a printing device for printing the documents. In additional embodiments, one or more of the second applications may receive and display other documents including: work orders, vehicle maintenance data, campaigns of original equipment manufacturers (OEMs), vehicle recall information, receipts, weight tickets, work orders, part orders, instruction manuals, schematics, or the like. In some embodiment, such documents may be obtained from (1) the memory elements of the lift control module 60, (2) from other computing devices associated with the user (e.g., other shop computing devices), or (3) from remote data storage locations (e.g., the cloud). In other embodiments, however, such documents may be obtained from third-party computing devices. Furthermore, such documents may be printed as necessary via the printing device.

Because the advanced operating platform facilitates multitasking, the user can use the lift control module 60 to simultaneously execute and run any of the first and/or second applications. For example, while the user is using the Lift Program 72 (i.e., the first program) to raise a vehicle with the lifts 22 of the lift system 20, the user may have a question or require information about using the lifts 22 or about the vehicle being lifted. Instead of being required to stop the Lift Program 72 to access a second application (e.g., the Video Tutorials 76 program) to obtain the need information, the user can simultaneously access the second application. As shown in FIG. 11, which illustrates the Lift Program 72 being displayed on the GUI of the lift control module 60, the Lift Program 72 may include a home button 102, which when selected takes the user to the Menu Screen 70 (i.e., FIG. 7) from which the user can access any of the second applications. For example, while using the Lift Program 72, if the user requires further instructions on how to use the lifts 22, the user can select the home button 102 and subsequently access the Video Tutorials 76 program to review video-based instructions on how to use the lifts 22. Once the user has reviewed the instructions, the user can select the Lift Program 72 again to continue operating the lifts 22 of the lift system 20.

Additionally, the advance operating platform facilitates any two or more of the applications (i.e., the first and/or second applications) to be simultaneously displayed via the graphic display of the lift control module 60. For example, the advance operating platform may provide for the graphic display to be divided up into a plurality of viewing areas, with one of the first or second applications capable of being displayed in each viewing area. As such, if a user is using the Lift Program 72 in a first viewing area to control the selected lifts 22 of the lift control module, the user can simultaneous use a second application (e.g., the Website 78 program) in a second viewing area so as to simultaneously search the web to obtain information that may be needed to complete the task. In some embodiments, the advanced operating platform may divide the graphic display up into two, four, six, eight, or more viewing areas. As such, the user does not have switch back and forth between applications. Instead, the user can simultaneously use as many applications as necessary to complete his/her task. Furthermore, embodiments of the present invention may provide for any of the viewing areas displayed on the graphic display of the lift control module 60 to be minimized and/or maximized. For example, if a user is simultaneously viewing a first application and a second application via a first viewing area and a second viewing area, respectively, the user can select for one of the first application or the second application to be maximized to fill generally the entire graphic display, such that the other of the first application or second application is minimized.

In further embodiments, the lift control module 60 may include one or more second applications that allow the user to contact third-parties, such as the lift 22 manufacturer or service provider, to obtain real-time technical support and/or training. The communication between the lift control module 60 and the third-party can be accomplished wirelessly through the communications network and may include, for instance, satellite, Internet and/or cellular networks. To facilitate communication between the user of the lift control module 60 and the third-party providing technical support or training, the lift control module 60 can be equipped with a camera, a microphone, and/or a keyboard, as previously described. The camera can be a still camera or a video camera, which allows the user to transmit images or video obtained by the user. For example, such images or video may include images or video of the lifts 22 of the lift system 20, the vehicle being lifted, and/or the environment around the lift system 20. As such, the third-party can view, in real time, the situation the user of the lift control module 60 is experiencing. Similarly, the microphone allows the user of the lift system 20 to verbally communicate with the third-party, such as to obtain the required technical support or training. Furthermore, when the lift control module 24 is equipped with a video camera and a microphone, technical support and/or training can be facilitated via video conferencing. In certain embodiments, the lift control module 60 will facilitate communication between the user of the lift control module 60 and the third-party via voice, SMS, or textual messaging.

In addition to using the lift control module 60 to communication with third-parties, some embodiments of the present invention provide for the lift control module 60 to communicate with and be accessed by, via the communications network, one or more independent computing devices. For example, in embodiments in which the lift control module 60 is being used by a business (e.g., a vehicle maintenance shop) to control vehicle lifts 22, such independent computing devices may include internal computers used by the business. As such, managers of the business are enabled, for instance, to remotely check the status of all the lifts 22 being used in the manager's area of responsibility from one or more of the independent computing devices. In further embodiments, the manager can verify, via the independent computing devices that all periodic inspections and maintenance requirement of any of the lifts 22 are current and up-to-date. Other information that may be available and accessible remotely includes a status of the battery (e.g., amount of charge, are they being charged properly, etc.). For example, the manager can verify that all lifts 22 are turned off and are being recharged at the end of a shift. Furthermore, if a lift 22 has a problem which requires it to be removed from service, the manager can remotely lock the lift 22 out and/or power it off, via the independent computing device, so no one can use it until it has been released from the lock out. Furthermore still, if a lift 22 is stolen, it can be deactivated remotely and a GPS of can be activated on the lift 22 to show its current location. Businesses that lease lifts 22 can similarly deactivate lifts 22 remotely should a lease contract expire and/or if lease payments are late. In still further embodiments, because the lift control module 60 may be a removable, portable computing device (e.g., tablet or smartphone), the manager can perform all of the above remotely via the lift control module 60, with no need to access an independent computing device.

When the lifts 22 of the lift system 20 are equipped with wireless communication capabilities (e.g., via a lift control module 60 coupled with the lifts 22 or via the transceiver 46 directly incorporated with one or more of the lifts 22), maintenance, technical support, and/or training can be enhanced. Specifically, the lift control system of each the lifts 22 are configured to collect their own operational and maintenance data (i.e., lift data). As such, embodiments of the present invention facilitate remote diagnostics, remote troubleshooting, and remote tracking and/or storing of lift data of all of the lifts 22 of the lift system 20. In particular, such lift data can be transferred from each of the lifts 22 of the lift system 20 and received and stored on the lift control module 60. In some further embodiments, the lift data may be transferred and stored remotely, such as on a remote computing device, server-based memory storage, or cloud-based memory storage, or the like. As previously described, the lift data that can be tracked and/or stored may include any data or information relevant to the safety, maintenance, and/or proper operation of the lifts 22 of the lift system 20. Specific examples of such lift data may include, energy (i.e., battery) usage, energy (i.e., battery) levels, lift height, lift velocity, lifting load weights, lifting frequencies, locations, or the like. Embodiments provide for such lift data to be regularly gathered and stored for use in diagnosing lift 22 issues and problems, notifying users of lift 22 maintenance requirements, and/or warning users of improper or dangerous lift 22 operations. For example, embodiments may provide users with maintenance alerts to remind the user when the lifts 22 or the lift control module 60 is in need of maintenance. Such alerts may be based, at least in part, on the lift data that is collected and stored. As such, the maintenance alerts can be based on actual usage of the lifts 22 and not arbitrary maintenance schedules. Such alerts may also be given in instances where the lifts 22 are experiencing failures or errors. In some embodiments, the alerts may be displayed directly on the graphic display of the lift control module 60. In other embodiments, the alerts may be displayed in the form of an email, a text message, or an audio alert.

Embodiments of the present invention also provide for analysis of such lift data to improve future products and/or to enhance productivity of the lift system 20. Such analysis may be performed by the lift control module 60, or by remote computing devices as described below. In embodiments, where the lift data is stored on remote computing devices (e.g., the cloud), such lift data is capable of being remotely accessed so as to provide remote, real-time access to data. For example, embodiments of the present invention may provide for battery usage information of each of the lifts 22 of the lift system 20 to be collected. Thereafter, the battery usage information can be analyzed to determine if the current battery-type is performing satisfactorily, or if a new battery-type should be used instead.

In other embodiments, the lift control module 60 will include a plurality of security features to prevent unauthorized access to applications and features performed by the lift control module 60 and/or to prevent unauthorized access or control of any of the lifts 22. For instance, in some embodiment, the advanced operating platform of lift control module 60 will provide a kiosk style interface, such that users of the lift control module 60 will only be able to access those specific applications and features necessary to operate the lifts 22. In such embodiments, the user will not have access to any other applications or features/hardware (e.g., Video Tutorial 76 program, Website 78 program, camera, etc.). In other embodiments, the lift control module 60 will have most navigation functionality removed. As such, for example, a user may not be allowed to exit from the Lift Program 72 to access any other second applications. In such embodiments, the navigation functionality will only be returned if so desired and authorized by the system developer or authorized personnel (e.g., a manager). In still further embodiments, the lift control module 60 may include only a single application, such as the Lift Program 72, such that the lift control module 60 is only operable to execute and run the Lift Program 72 and no other second applications.

Given the lift control module 60 described above, including the advanced operating platform included therein, embodiments of the present invention provide for the lift control module 60 to simultaneously execute a plurality of applications, including the first application (e.g., the Lift Program 72) and one or more second applications (e.g., the Manuals program 74, the Video Tutorials program 76, and the Website 78 program). Nevertheless, it should be understood that the second applications can include any of the functions and features previously described herein, with such second applications not generally relating to the control or direction of one or more of the lifts 22 of the lift system 20. As such, embodiments provide for the lift control module 60 to perform a method with a plurality of steps. For example, one of the steps may include generating a user interface displayable on a display device of the lift control module 60. Another step may include receiving information, via the user interface, indicative of a first user instruction for the lift control module 60 to perform a first function, with the first function including controlling the lift actuator 36 associated with the vehicle lift 22. An additional step may include providing instructions to the vehicle lift 22 to perform the first function in response to the first user instruction. A further step may include receiving information, via the user interface, indicative of a second user instruction to perform a second function. A still further step may include performing the second function in response to the second user instruction, with the first function and the second function being performed simultaneously.

It is to be understood that while certain forms of the present invention have been illustrated and described herein, it is not to be limited to the specific forms or arrangement of parts described and shown.

The invention claimed is:

1. A vehicle lift system including a vehicle lift with a post, an actuator, and a carriage assembly, where said vehicle lift system further comprises:
   a lift control system for controlling the actuator so as to lift the carriage assembly relative to the post, wherein said lift control system includes at least one core processor;
   a lift control module for providing instructions to said lift control system, said lift control module including—
      a graphic display configured to display one or more graphical user interfaces (GUIs) for receiving user instructions from a user, wherein said graphic display comprises a touchscreen;
      at least one control module processor,
      a non-transitory computer-readable medium comprising:
         a first application stored thereon, wherein said first application is configured to instruct said at least one control module to generate a first GUI on the graphic display of said lift control module, wherein the first GUI includes plurality of selectable icons for controlling operation of the vehicle lift,
         wherein upon activation of said first application, the user is required to provide authentication information, via said lift control module, before the user can control operation of the vehicle lift via the selectable icons of the first GUI,
         wherein one of the selectable icons of the first GUI is a selectable lock icon, and wherein when the selectable lock icon is selected by the user, said first application is configured to restrict control of the vehicle lift until the user provides authentication information via the lift control module,
         a second application stored thereon, wherein said second application is operable to direct said at least one control module processor to perform certain steps, with such certain steps not directed to controlling operation of the vehicle lift,
      wherein said lift control module is configured to execute said first application and said second application simultaneously; and
   a communication link between said lift control system and said lift control module.

2. The vehicle lift system of claim 1, wherein the lift control module further comprises a microphone for receiving voice inputs from the user.

3. The vehicle lift system of claim 2, wherein the voice inputs include voice commands, and wherein the lift control module is configured to control operation of the vehicle lift based on the voice commands.

4. The vehicle lift system of claim 2, wherein the voice inputs comprise the authentication information provided by the user.

5. The vehicle lift system of claim 1, wherein the authentication information includes an iris scan obtained by a camera associated with the lift control module.

6. The vehicle lift system of claim 1, wherein the authentication information includes a fingerprint scan obtained by a camera associated with the lift control module.

7. The vehicle lift system of claim 1, wherein the vehicle lift includes a battery, and wherein the first GUI presents an indication of a voltage level of the battery.

8. The vehicle lift system of claim 7, wherein the lift control module is configured to provide an alert when the voltage level is low.

9. The vehicle lift system of claim 1, wherein the vehicle lift includes communication elements for communicating with other vehicle lifts over a communications network, wherein the first GUI presents information indicative of a network type of the communications network, wherein the network type is selected from one or more of the following: WiFi, RF, and cellular networks.

10. The vehicle lift system of claim 9, wherein the communications network is an RF network, and wherein the first GUI presents an indication as to the channel being used by the communications network.

11. The vehicle lift system of claim 1, wherein the communications link between the lift control system and the lift control module is wireless.

12. The vehicle lift system of claim 1, wherein the lift control module is configured to be removably attached to said vehicle lift.

13. The vehicle lift system of claim 1, wherein the first GUI is further configured to display a disclaimer statement and a verification icon, and wherein the user is required to select the verification icon before the user can control operation of the vehicle lift via the selectable icons of the first GUI.

14. The vehicle lift system of claim 1, wherein the second application is configured to present, via the lift control module, a manual that instructs the user how to operate the vehicle lift.

15. The vehicle lift system of claim 1, wherein the second application is configured to present, via the lift control module, a video that instructs the user how to operate the vehicle lift.

16. The vehicle lift system of claim 1, wherein the second application is configured to display and analyze lift data, wherein the lift data comprises lift operational data, lift maintenance data, lift diagnostics data.

17. The vehicle lift system of claim 16, wherein lift control module is configured to generate user alerts based on the lift data.

18. The vehicle lift system of claim 1, wherein the lift control module includes a speaker for providing audible information to the user.

19. A computer-implemented method for controlling a vehicle lift, wherein the vehicle lift includes a post, an actuator, a carriage assembly, and a lift control module, wherein the computer-implemented method comprises the following steps:

generating a graphical user interface (GUI) on a touchscreen of the lift control module;

executing, via the lift control module, a first application for controlling operation of the vehicle lift;

executing, via the lift control module, a second application for performing functions other than controlling operation of the vehicle lift, wherein the first application and the second application are executed simultaneously, restricting control of the vehicle lift until a user provides, via the lift control module, authentication information;

receiving authentication information, via the lift control module, from the user;

generating, via the first application, a plurality of selectable icons on the GUI for controlling operation of the vehicle lift;

receiving an indication of the user selecting a first of the selectable icons;

controlling the actuator of the vehicle lift in response to the first selectable icon being selected by the user, wherein a second of the plurality of selectable icons on the GUI includes a selectable lock icon, receiving an indication of the user selecting the selectable lock icon; and restricting control of the vehicle lift, based on the user selecting the selectable lock icon, until the user provides authentication information via the lift control module.

* * * * *